US012587993B2

(12) United States Patent
Hu

(10) Patent No.: US 12,587,993 B2
(45) Date of Patent: Mar. 24, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Rongyi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 343 days.

(21) Appl. No.: 18/350,439

(22) Filed: Jul. 11, 2023

(65) Prior Publication Data

US 2023/0362872 A1      Nov. 9, 2023

Related U.S. Application Data

(63) Continuation of application No. PCT/CN2021/071910, filed on Jan. 14, 2021.

(51) Int. Cl.
*H04W 64/00*      (2009.01)
*H04L 5/00*      (2006.01)

(52) U.S. Cl.
CPC .......... *H04W 64/00* (2013.01); *H04L 5/0051* (2013.01)

(58) Field of Classification Search
CPC . H04W 64/00; H04W 36/0088; G01S 5/0009; G01S 5/0205; H04L 5/0023; H04L 5/0048; H04L 5/0051; H04L 5/0094
See application file for complete search history.

(56) References Cited

U.S. PATENT DOCUMENTS

| | | | | |
|---|---|---|---|---|
| 5,852,630 A | * | 12/1998 | Langberg | ............ H04L 27/2647 375/219 |
| 2013/0267246 A1 | * | 10/2013 | Wang | .................... H04W 24/00 455/456.1 |
| 2018/0109302 A1 | * | 4/2018 | Nagaraja | ................ H04W 24/02 |
| 2018/0295600 A1 | | 10/2018 | Kumar et al. | |
| 2020/0275297 A1 | * | 8/2020 | Jung | .................... H04B 7/0626 |
| 2022/0086675 A1 | * | 3/2022 | Manolakos | ........... H04L 5/0051 |
| 2022/0104059 A1 | * | 3/2022 | Hu | ......................... H04W 24/02 |

(Continued)

FOREIGN PATENT DOCUMENTS

| | | |
|---|---|---|
| CN | 104540169 A | 4/2015 |
| CN | 105580441 A | 5/2016 |

(Continued)

OTHER PUBLICATIONS

International Search Report and Written Opinion dated Oct. 15, 2021 in International Application No. PCT/CN2021/071910. English translation attached.

(Continued)

*Primary Examiner* — Siu M Lee
(74) *Attorney, Agent, or Firm* — Sheppard, Mullin, Richter & Hampton LLP

(57) ABSTRACT

Provided are a wireless communication method, a terminal device, and a network device. The method includes: transmitting, by a network device, first information to a terminal device in response to a PRS configuration being changed. The first information is used by the terminal device for determining an adjusted Measurement Gap (MG) related configuration.

20 Claims, 5 Drawing Sheets

200

The terminal device determines the adjusted MG related configuration based on the adjusted PRS configuration
— S210

(56)                    References Cited

U.S. PATENT DOCUMENTS

| | | | | |
|---|---|---|---|---|
| 2023/0164735 A1* | 5/2023 | Si | ..................... | H04L 5/0091 |
| | | | | 455/456.1 |
| 2023/0337172 A1* | 10/2023 | Manolakos | ............... | G01S 5/02 |
| 2023/0354250 A1* | 11/2023 | Shimoda | ............... | H04W 64/00 |

FOREIGN PATENT DOCUMENTS

| | | | | |
|---|---|---|---|---|
| CN | 111342943 A | 6/2020 | | |
| CN | 111417189 A | 7/2020 | | |
| WO | WO-2020248261 A1 * | 12/2020 | ........ | H04W 36/0094 |
| WO | WO-2021237531 A1 * | 12/2021 | ............ | H04W 24/10 |

OTHER PUBLICATIONS

Qualcomm Inc. "Potential Enhancements for NR Rel-17 Positioning;" 3GPP TSG RAN WG1 #102-e, R1-2006810;, Aug. 28, 2020 (Aug. 28, 2020) entire document.
Intel Corporation. "Scope update for Rel-17 NR MG Enhancements WI;" 3GPP TSG-RAN Meeting #90-e, RP-202660;, Dec. 11, 2020 (Dec. 11, 2020), entire document.
Qualcomm Inc. "New WID on enhancements to measurement gaps for NR;" 3GPP TSG RAN Meeting #88e, RP-201000;, Jul. 3, 2020 (Jul. 3, 2020), entire document.
"3rd Generation Partnership Project; Technical Specification Group Radio Access Network;NR;Requirements for support of radio resource management(Release 16)" 3GPP TS 38.133 V16.4.0 (Sep. 2020), section 9.
"3rd Generation Partnership Project; Technical Specification Group Radio Access Network;Study on NR Positioning Enhancements;(Release 17)" 3GPP TR 38.857 V0.4.0 (Nov. 2020), section 10.3and 11.
Extended European Search Report dated Feb. 12, 2024 received in European Patent Application No. EP21918464.5.
Vivo:"Remaining issue on prioritization of positioning assistance data", 3GPP Draft; R1-2008678, 3rd Generation Partnership Project (3GPP) , Mobile. Competence Centre; 650, Route Des Lucioles; F-06921 Sophia-Antipolis Cedex; France vol. RAN WG1, No. e-Meeting; Oct. 26, 2020-Nov. 13, 2020 Nov. 1, 2020 (Nov. 1, 2020), XP052350608.
Huawei et al:"Discussion on RSTD measurement", 3GPP Draft; R4-2011156,3rd Generation Partnership Project (3GPP) , Mobile Competence Centre ; 650, Route Des Lucioles;F-06921 Sophia-Antipolis Cedex; France vol. RAN WG4, No. Electronic Meeting; Aug. 17, 2020-Aug. 28, 2020 Aug. 7, 2020 (Aug. 7, 2020), XP052415560.

* cited by examiner

100

<u>200</u>

| The terminal device determines the adjusted MG related configuration based on the adjusted PRS configuration | S210 |

FIG. 5

Network device 400

Communication unit 410

FIG. 6

Terminal device 500

Communication unit 510

FIG. 7

Terminal device 800

Processing unit 810

FIG. 8

WIRELESS COMMUNICATION METHOD, TERMINAL DEVICE, AND NETWORK DEVICE

CROSS-REFERENCE TO RELATED APPLICATIONS

This application is a continuation of International Application No. PCT/CN2021/071910 filed on Jan. 14, 2021, the entire contents of which are incorporated herein by reference.

FIELD

Embodiments of the present disclosure relate to the communication field, and more particularly, to a wireless communication method, a terminal device, and a network device.

BACKGROUND

In order to realize a positioning technology of a communication system, a Positioning Reference Signal (PRS) is designed. However, a PRS configuration is relatively fixed and incapable of being adjusted flexibly based on actual positioning requirements of a terminal device, and it will also cause a certain degree of waste of PRSs.

Rel-17 introduces an on demand PRS (or Sounding Reference Signal (SRS)) mode, which means that the PRS configuration can be adjusted as desired. For example, when only a very small number of terminal devices need to obtain positioning information, the number of frequency layers, bandwidth, transmission frequency (the number of transmissions per unit time), etc. of the PRS can be reduced.

In order to better realize mobility handover of a terminal device, a network device may configure the terminal device to measure reference signals of an intra-frequency, inter-frequency, or inter-network target neighbour cell in a specific time window. The specific time window is a Measurement Gap (MG). PRS measurement is limited to be performed only in an MG. When the a periodicity of the MG is much greater than a periodicity of the PRS, there may be a lot of PRSs that fall outside the MG and cannot be measured, resulting in PRS waste. On the other hand, when the periodicity of the MG is far smaller than the periodicity of the PRS, too frequent MGs will affect the normal uplink and downlink data transmission of a User equipment (UE). Therefore, how to improve the PRS utilization efficiency is an urgent problem to be solved when on demand transmission of a PRS reference signal is supported.

SUMMARY

The present disclosure provides a wireless communication method, a terminal device, and a network device.

In a first aspect, a wireless communication method is provided. The method includes: transmitting, by a network device, first information to a terminal device in response to a PRS configuration being changed, the first information being used by the terminal device for determining an adjusted MG related configuration.

In a second aspect, a wireless communication method is provided. The method includes: receiving, by a terminal device, first information transmitted by a network device in response to a PRS configuration being changed, the first information being used by the terminal device for determining an adjusted MG related configuration.

In a third aspect, a network device is provided. The network device includes a processor and a memory. The memory is configured to store a computer program, and the processor is configured to invoke and execute the computer program stored in the memory to perform the method according to the above-described first aspect or various implementations thereof.

BRIEF DESCRIPTION OF THE DRAWINGS

FIG. 5 is a schematic interaction diagram of a wireless communication method according to an embodiment of the present disclosure.

FIG. 6 is a schematic block diagram of a network device according to an embodiment of the present disclosure.

FIG. 7 is a schematic block diagram of a terminal device according to an embodiment of the present disclosure.

FIG. 8 is a schematic block diagram of a terminal device according to an embodiment of the present disclosure.

DETAILED DESCRIPTION

Figure 1:
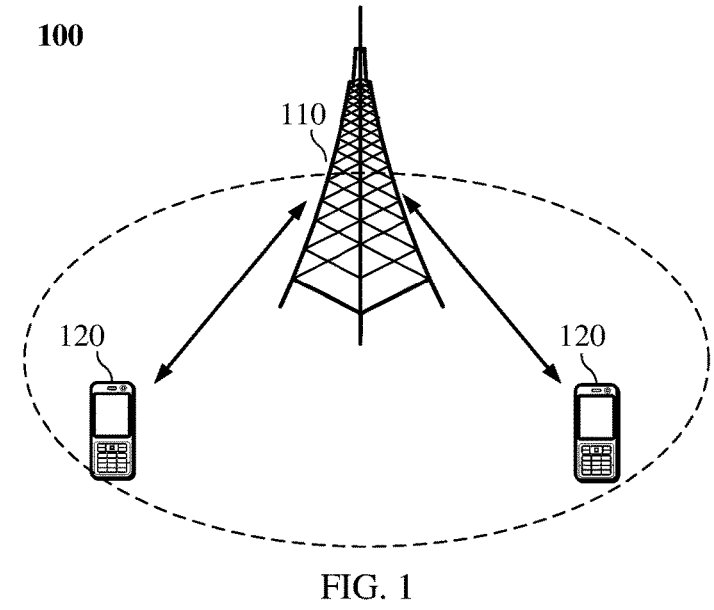
FIG. 1 is a schematic diagram of a communication system architecture according to an embodiment of the present disclosure.

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, an Non-Terrestrial Networks (NTN) system, a Universal Mobile Telecommunication System (UMTS), a Wireless Local Area Networks (WLAN), Wireless Fidelity (WiFi), a 5th-Generation (5G) system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, or Vehicle to everything (V2X) etc. The embodiments of the present disclosure may also be applied to these communication systems.

In some embodiments of the present disclosure, the communication system according to an embodiment of the present disclosure may be applied to a Carrier Aggregation (CA) scenario, a Dual Connectivity (DC) scenario, and a Standalone (SA) network deployment scenario.

In some embodiments of the present disclosure, the communication system according to an embodiment of the present disclosure may be applied to an unlicensed spectrum. The unlicensed spectrum may also be considered a shared spectrum. Alternatively, the communication system according to an embodiment of the present disclosure may also be applied to an authorized spectrum. The authorized spectrum may also be considered as a non-shared spectrum.

Various embodiments are described in combination with a network device and a terminal device. The terminal device may also be referred to as a UE, an access terminal, a user unit, a user station, a mobile station, a mobile platform, a remote station, a remote terminal, a mobile device, a user terminal, a terminal, a wireless communication device, a user agent, or a user device, etc.

The terminal device may be a STATION (ST) in a WLAN, and may be a cellular phone, a cordless phone, a Session Initiation Protocol (SIP) phone, a Wireless Local Loop (WLL) station, a Personal Digital Assistant (PDA), a hand-held device having a wireless communication function, a computing device or another processing device connected to a wireless modem, a vehicle-mounted device, a wearable device, a terminal device in a next generation communication system such as an NR Network, or a terminal device in a future evolved Public Land Mobile Network (PLMN) Network, and the like.

In the embodiments of the present disclosure, the terminal device may be deployed on land, including indoor or outdoor, handheld, wearable or vehicle-mounted terminal devices; may also be deployed on water (such as on a ship and the like); and may also be deployed on air (e.g., on airplanes, balloons, satellites, etc.).

In the embodiments of the present disclosure, the terminal device may be a Mobile Phone, a tablet personal computer (Pad), a computer with a wireless transceiver function, a Virtual Reality (VR) terminal device, an Augmented Reality (AR) terminal device, a wireless terminal device in industrial control, a wireless terminal device in self-driving, a wireless terminal device in remote medical treatment, a wireless terminal device in smart grid, a wireless terminal device in transportation safety, a wireless terminal device in smart city, a wireless terminal device in smart home, or the like.

As an example and not a limitation, in the embodiments of the present disclosure, the terminal device may also be a wearable device. The wearable device may also be called a wearable intelligent device, which is a general term for wearable devices obtained through intelligence design and development on daily wears by applying wearable technology, such as glasses, gloves, wrist-watch, dress and shoes. The wearable device may be worn directly on the body or may be a portable device integrated into a user's clothing or accessory. The wearable device is not only a hardware device, but also realizes powerful functions through soft-ware support, data interaction and cloud interaction. In a broad sense, the wearable smart devices include those which have full functions and a large size, and can realize all or partial functions without depending on a smart phone, for example, smart watches, smart glasses and the like, and include those which only focus on a certain type of application function, and need to be used along with other device such as a smart phone, such as various smart bracelets, smart jewelry and the like for physical sign monitoring.

In the embodiments of the present disclosure, the network device may be a device for communicating with a mobile device, and the network device may be an Access Point (AP) in a WLAN, a Base Transceiver Station (BTS) in GSM or CDMA, a NodeB (NB) in WCDMA, an Evolutional Node B (eNB, or eNodeB) in LTE, a relay Station or an Access Point, or a vehicle-mounted device, a wearable device, a network device (gNB) in an NR network, or a network device in a future evolved PLMN network, and the like.

As an example and not a limitation, in embodiments of the present disclosure, a network device may have a mobile nature, e.g., the network device may be a mobile device. Alternatively, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, or the like. Alternatively, the network device may be a base station deployed on land, water, or the like.

In the embodiments of the present disclosure, a network device may provide a service for a cell, and a terminal device communicates with the network device through a transmission resource (for example, a frequency domain resource or a spectrum resource) used by the cell. The cell may be a cell corresponding to the network device (for example, a base station), and the cell may belong to a macro base station or a base station corresponding to a Small cell. The Small cell may include: a Metro cell, a Micro cell, a Pico cell, a Femto cell, and the like. The Small cell is characterized by small coverage area and low transmitting power, and is suitable for providing high-rate data transmission services.

Exemplarily, a communication system 100 where the embodiment of the present disclosure is applied is shown in FIG. 1. The communication system 100 may include a network device 110. The network device 110 may be a device that communicates with a terminal device 120 (or referred to as a communication terminal, a terminal). The network device 110 may provide communication coverage for a particular geographic area and may communicate with a terminal device located within the coverage area.

FIG. 1 schematically illustrates a network device and two terminal devices. Optionally, the wireless communication system 100 may include a plurality of network devices, and each network device may cover a different number of terminal devices within its coverage area, which is not limited in the embodiment of the present disclosure.

Optionally, the communication system 100 may further include other network entities such as a network controller, a mobility management entity, and the like, which is not limited in the embodiment of the present disclosure.

It should be understood that a device having a communication function in a network/system in an embodiment of the present disclosure may be referred to as a communication device. Taking the communication system 100 shown in FIG. 1 as an example, the communication device may include the network device 110 and the terminal device 120 having a communication function, and the network device 110 and the terminal device 120 may be specific devices described above and will not be described here. The communication device may further include other network entities such as a network controller, a mobility management entity, and the like, in the communication system 100, which is not limited in the embodiment of the present disclosure.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

It should be understood that the reference to "indication" in embodiments of the present disclosure may be a direct indication, may be an indirect indication, or may be indicative of an association. For example, A indicates B, which can mean that A directly indicates B, for example, B can be obtained through A. It can also mean that A indirectly indicates B, for example, A indicates C, and B can be obtained by C. It can also indicate that there is an association between A and B.

In the description of embodiments of the present disclosure, the term "correspondence" may mean that there is a direct correspondence relationship or an indirect correspondence relationship between the two, may also mean that there is an association relationship between the two, may also be a relationship between indication and being indicated, configuration and being configured, etc.

In embodiments of the present disclosure, "predefined" may be achieved by pre-storing corresponding codes, tables, or other means that may be used for indicating relevant information in a device (e.g., including a terminal device and a network device), and the present disclosure is not limited to the specific implementation thereof. For example, predefined can refer to what is defined in the protocol.

In an embodiment of the present disclosure, the "protocol" may refer to a standard protocol in the communication field, for example, may include an LTE protocol, an NR protocol, and related protocols applied in a future communication system, which is not limited in the present disclosure.

Positioning technology is one of the core technologies of a communication system and a navigation system. For example, each of a satellite navigation system, Bluetooth, Wireless Fidelity (Wireless Fidelity, WiFi), etc., provides a positioning function. Similarly, a modern cellular communication system also supports the positioning function. Starting from a 3G system and a Long Term Evolution (LTE) system, various advanced positioning technologies are gradually added to the cellular communication system. The positioning technology will also be supported in a New Radio (NR) system. In the NR Rel-16 (R16) of the 3rd Generation Partnership Project (3GPP), some positioning technologies are introduced. For example, a Downlink Time Difference of Arrival positioning method (DL-TDOA), Uplink Time Difference of Arrival positioning method (UL-TDOA), Multiple Round Trip Time positioning method (Multi-RTT), Downlink Angle of Departure positioning method (DL-AoD), Uplink Angle of Arrival positioning method (UL-AoA), enhanced cell ID positioning method, and the like.

Figure 2:
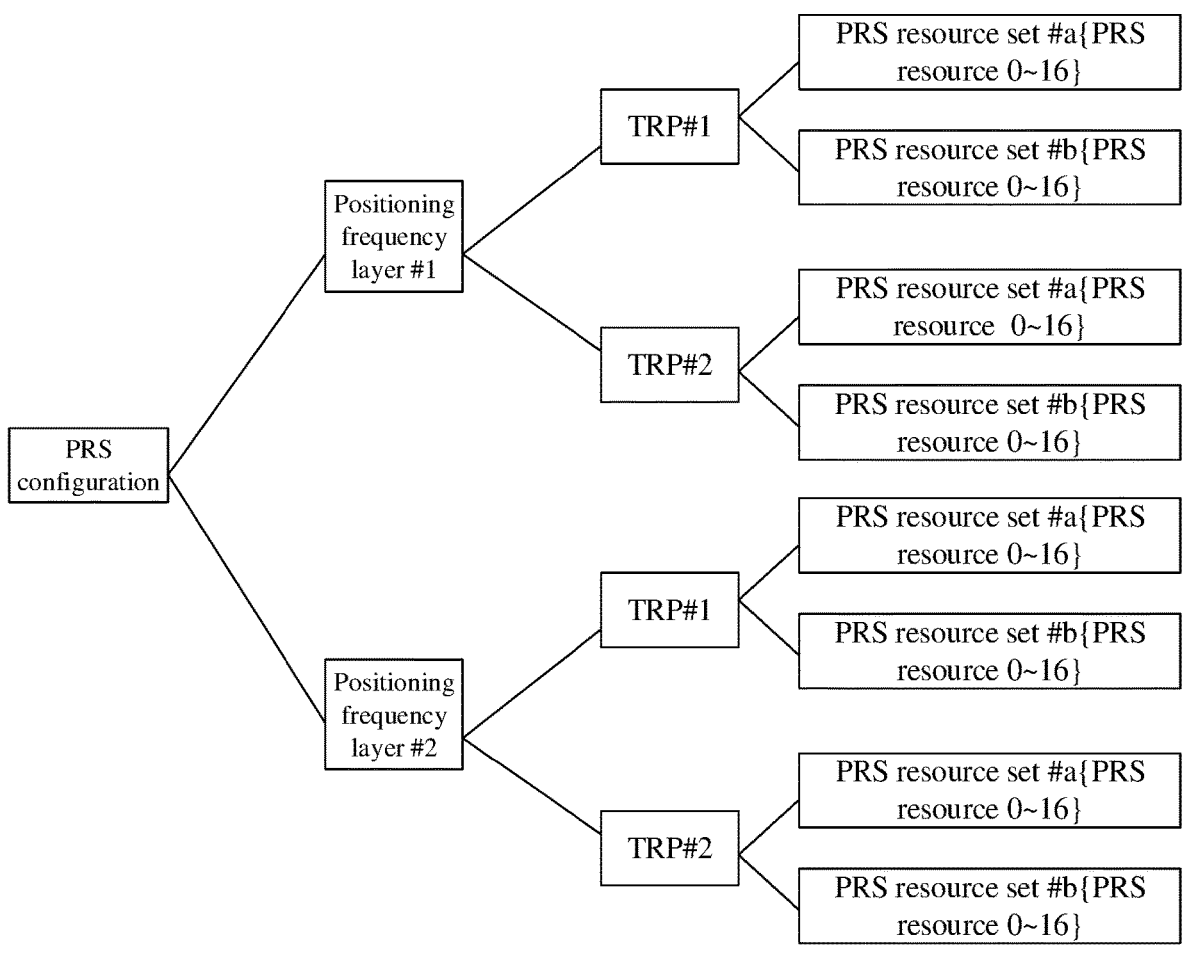
FIG. 2 is a schematic diagram of a PRS structure according to an exemplary embodiment of the present disclosure.

In order to realize the above positioning technologies, positioning reference signals (PRS) are designed. The signal structure of the PRS (or PRS configuration) is shown in FIG. 2.

A first level is PRS frequency layer (also known as positioning frequency layer, referred to as PFL), which contains PRS resources of multiple Transmission Reception Points (TRP). All PRS resources in a same PFL have the same Subcarrier spacing (SCS), Cyclic Prefix (CP), PRS point A, comb size, PRS frequency domain bandwidth, and PRB start position.

A second level is TRP, which contains multiple PRS resource sets.

A third level is PRS resource set information, which contains multiple PRS resources. All PRS resources within a same resource set may have a same PRS periodicity.

A fourth level is PRS resource information.

At present, the PRS configuration is relatively fixed, which cannot be flexibly adjusted according to the actual positioning requirements of a terminal device, and it will also cause a certain degree of PRS waste. Rel-17 introduces an on demand PRS (or Sounding Reference Signal (SRS)) mode, which can be triggered by a terminal device or a Location Management Function (LMF) entity. For example, when there are many terminal devices that urgently need to obtain location information, the terminal device may perform the measurement more quickly by increasing the number of frequency layers, bandwidth, transmission frequency, etc. of the PRS. On the other hand, when only a few terminal devices need to obtain location information, the load of the network can be reduced by reducing the number of frequency layers, bandwidth, and transmission frequency of the PRS.

In order for the UE to better realize the mobility handover, the network device may configure the UE to measure reference signals of an intra-frequency, inter-frequency, or inter-network target cell in a specific time window. The specific time window is a Measurement Gap (MG), and the MG can be configured through measGapConfig or through a MG pattern. For example, the length of the MG (MGL), the periodicity of the MG (MGRP, MG Repetition Period), and the start position offset (gapoffset) of the MG may be configured.

Table 1 shows an example of an MG pattern configuration.

TABLE 1

| Gap pattern ID | MGL, ms | MGRP, ms |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |

TABLE 1-continued

| Gap pattern ID | MGL, ms | MGRP, ms |
|---|---|---|
| 23 | 1.5 | 160 |
| 24 | 10 | 80 |
| 25 | 20 | 160 |

Here, pattern #24/25 is introduced for PRS measurement, mainly considering that the required MGL will be relatively great when the number of repetitions of the PRS is relatively great.

When multiple measurements are located in a same MG, it is necessary to consider how to carry out MG sharing, and determine the Carrier Specific Scaling Factor (CSSF) according to the sharing scheme, so as to calculate the time required for the measurement. The MG sharing may be indicated by the number of measurement objects in the MG (where the number of intra-frequency measurement objects is denoted as $M_{intra,\ i,\ j}$, the number of inter-frequency measurement objects as $M_{inter,\ i,\ j}$, and the number of total measurement objects as $M_{tot,\ i,\ j} = M_{intra,\ i,\ j} + M_{inter,\ i,\ j}$), and a sharing scheme parameter (measGapSharingScheme) configured at a high layer.

For example, when measGapSharingScheme indicates an equalization scheme, $CSSF_{within\_gap,\ i} = $max (ceil $(R_i \times M_{tot,i,j})$), where $j = 0 \ldots (160/MGRP)-1$.

When measGapSharingScheme indicates a non-equalization scheme, the value of $K_{intra}/K_{inter}$ is determined according to the indication.

When a measurement object i is intra-frequency measured, the maximum of the following two values is taken:

ceil($R_i \times K_{intra} \times M_{intra,i,j}$) in gaps, where $M_{inter,i,j} \neq 0$,
$\quad j = 0 \ldots (160/MGRP)-1$.          1.

ceil($R_i \times M_{intra,i,j}$) in gaps, where $M_{inter,i,j} = 0, j = 0 \ldots$
$\quad (160/MGRP)-1$.          2.

When the measurement object i is inter-frequency measured, the maximum of the following two values is taken:

ceil($R_i \times K_{inter} \times M_{inter,i,j}$) in gaps, where
$\quad M_{intra,i,j} \neq 0 \ldots (160/MGRP)-1$.          1.

ceil($R_i \times M_{inter,i,j}$) in gaps, where $M_{intra,\ i,j} = 0, j = 0 \ldots$
$\quad (160/MGRP)-1$.          2.

Here Ri represents a maximum ratio of the number of MGs in which the measurement object i can be a to-be-measured object to the number of MGs in which the measurement object i can be a to-be-measured object and which is not used for a long-periodicity PRS measurement.

The values of $K_{intra}$ and $K_{inter}$ are determined by the parameter measGapSharingScheme. See Table 2 below.

TABLE 2

| measGapSharingScheme | Value of X (%) |
|---|---|
| '00' | Equalization scheme |
| '01' | 25 |
| '10' | 50 |
| '11' | 75 |

Here measGapConfig and measGapSharingConfig can be configured through MeasConfig.

In R16, the PRS measurement is limited to be performed only in an MG, and the measurement time of a PRS needs to consider parameters such as a periodicity and a time domain offset of each of the PRS and the MG. When the periodicity of the MG is much greater than the periodicity of the PRS, there may be a lot of PRSs that fall outside the MG and cannot be measured, resulting in PRS waste. On the other hand, when the periodicity of the MG is far smaller than the periodicity of the PRS, too frequent MGs will affect the normal uplink and downlink data transmission of a UE.

It is an urgent problem to adjust the MG pattern or MG sharing mode to improve the utilization efficiency of the PRS when the on demand transmission of PRS is supported.

In order to facilitate understanding of the technical solution of the embodiments of the present disclosure, the technical solution of the present disclosure will be described in detail below by way of specific embodiments. As an optional solution, the following related technologies can be arbitrarily combined with the technical solution of the embodiments of the present disclosure, and all of them belong to the protection scope of the embodiments of the present disclosure. The embodiments of the present disclosure include at least some of the following.

Figure 3:
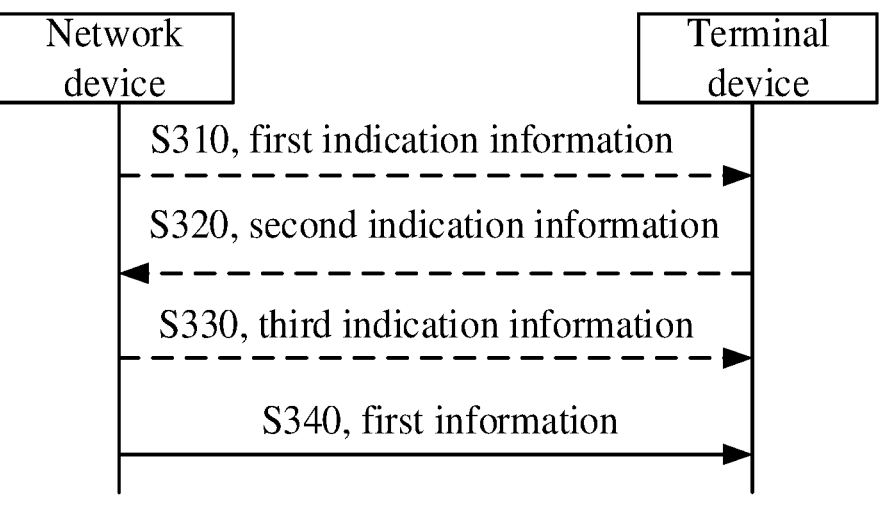
FIG. 3 is a schematic interaction diagram of a wireless communication method according to an embodiment of the present disclosure.

FIG. 3 is a schematic interaction diagram of a wireless communication method 200 according to an embodiment of the present disclosure. As shown in FIG. 3, the method 300 including the following.

At S340, first information is transmitted by a network device to a terminal device in response to a PRS configuration being changed. The first information is used by the terminal device for determining an adjusted MG related configuration.

It should be understood that the number of terminal devices of the embodiment of the present disclosure may be one or more.

In some embodiments, a change in the PRS configuration may be initiated by a terminal device (UE-initiated).

For example, the terminal device may transmit a first request to the network device. The first request is used for requesting the network device to adjust the PRS configuration. In some embodiments, the first request may include the PRS configuration required by the terminal device.

As another example, the terminal device may transmit a second request to the network device. The second request is used for requesting the network device to adjust the PRS configuration and the MG related configuration. In some embodiments, the second request may include the PRS configuration required by the terminal device and/or the MG related configuration required by the terminal device.

In other embodiments, the change in the PRS configuration may be initiated by a network device (Network-initiated).

For example, the network device may transmit a third signaling to the terminal device. The third signaling is used for the network device to adjust the PRS configuration of at least one terminal device. In some embodiments, the third signaling may include the PRS configuration adjusted by the network device.

In other words, the network device may adjust the PRS configuration of a terminal device or a group of terminals. That is, the adjustment of the PRS configuration triggered by the network device may be granular on a per UE or per UE group basis.

As another example, the network device may transmit a fourth signaling. The fourth signaling is used for the network device to adjust the PRS configuration of the terminal device in a cell corresponding to the network device. In some embodiments, the fourth signaling may be a broadcast message, which may include an adjusted PRS configuration.

In other words, the network device may adjust the PRS configuration of all terminal devices in the cell. That is, the adjustment of the PRS configuration triggered by the network device may be cell-granular.

It should be understood that the PRS configuration may include related configurations of the PRS measurement, which is not limited herein.

As an example, the PRS configuration includes at least one of: whether a PRS is transmitted; a number of frequency layers of the PRS; a length of the PRS in each frequency layer; a bandwidth of the PRS in each frequency layer; a number of TRPs transmitting the PRS in each frequency layer; a transmission periodicity of the PRS; a number of repetitions of the PRS; a number of symbols occupied by the PRS in each frequency layer; a length of the PRS; or a length of PRS resource. Alternatively, it may further include a PRS configuration added in the evolution of standards, such as a PRS aggregation level or a PRS aggregation configuration.

In some embodiments, different PRS configurations may be distinguished into different PRS transmitting levels, also known as PRS transmission levels. For example, different PRS transmission levels may correspond to different PRS parameter ranges.

As an example, PRS transmission levels are distinguished according to whether the bandwidth of the PRS is greater than X (the unit may be RB, MHz, etc.). For example, a bandwidth of the PRS being greater than X may correspond to one PRS transmission level, and a bandwidth of the PRS being smaller than or equal to X corresponds to another PRS transmission level.

As an example, PRS transmission levels are distinguished according to whether the length of the PRS is greater than Y (the unit may be ms or the number of slots, etc.). For example, a length of the PRS being greater than Y may correspond to one PRS transmission level, and a bandwidth of the PRS being smaller than or equal to Y corresponds to another PRS transmission level.

In other embodiments, different PRS transmission levels may also be distinguished according to at least two PRS parameters. The at least two PRS parameters may include at least two parameters in the PRS configuration of the example described above.

It should be understood that embodiments of the present disclosure do not limit the number of PRS transmission levels. For example, two or more PRS transmission levels may be distinguished according to different PRS configurations, which is not limited by the present disclosure.

In the embodiment of the present disclosure, when the PRS configuration changes, the network device adjusts the MG related configuration, thereby improving the measurement efficiency of the PRS.

It should be understood that the MG related configuration may include any configuration related to the PRS measurement, or may further include configurations related to the PRS measurement that are newly introduced in the evolution of standards, which is not limited by embodiments of the present disclosure. For example, a measurement window (P-MTC) is introduced for the PRS measurement (similar to an SS/PBCH block measurement timing configuration (SMTC) of a Synchronization Signal Block (SSB) measurement), and the MG related configuration may further include the measurement window configuration corresponding to the PRS measurement (P-MTC).

By way of example and not limitation, the MG related configuration includes at least one of: an MG pattern configuration; an MG sharing mechanism configuration; or a measurement priority configuration for a PRS in an MG.

In some embodiments of the present disclosure, the MG pattern configuration may include the length of the MG, i.e.

MGL, and the periodicity of the MG, i.e. MGRP, or may further include parameters newly introduced in the evolution of standards, such as the start position offset of the measurement gap, i.e. gapoffset, etc.

In some embodiments of the present disclosure, the MG sharing mechanism configuration may include the parameter measGapSharingScheme, or the Carrier Specific Scaling Factor (CSSF), and other related configurations, or may include a sharing mechanism for PRS and other RRM measurements newly introduced in the standard evolution, which is not limited by the present disclosure.

In some embodiments of the present disclosure, the MG related configuration may further include the measurement gap configuration, i.e. measGapConfig.

That is, when the PRS configuration changes, the network device can improve the measurement efficiency of the PRS by adjusting measGapConfig.

In some embodiments of the present disclosure, the MG configuration may include at least one of:

a periodicity of an MG (such as MGRP);

a timing advance of an MG (such as MGTA);

an offset of an MG (such as gapOffset); or a length of an MG (for example, MGL): a duration of an MG in each cycle.

It should be understood that the MG configuration may further include parameters newly introduced in the evolution of standards, which is not limited thereto.

In some embodiments of the present disclosure, an adjustment range of the PRS configuration needs to consider PRS processing capability of the terminal device, thereby avoiding excessive increase of the number of PRSs and improving the measurement efficiency of the PRS.

In some embodiments, the PRS processing capability of the terminal device may include capabilities such as the maximum measurement bandwidth supported by the terminal device, the number of frequency layers of the PRS, the number of TRPs, the maximum length of the PRS that can be processed by the terminal device, or the maximum number of PRS resources that can be processed within each slot.

For example, assuming that the PRS processing capacity reported by the terminal device is {N=0.5 ms, T=8 ms}, which means that the terminal device can process a PRS of N=0.5 ms per T=8 ms, then the length of a single PRS configured by the PRS configuration adjusted by the network device should not exceed N=0.5 ms. For example, when a subcarrier gap of the PRS is 15 k, it should not exceed 7 symbols.

As an example, for a UE-initiated adjustment of the PRS configuration, when the terminal device transmits the first request or the second request to request an increase of the length of the PRS, the requested length of the PRS should not exceed N=0.5 ms.

As another example, for a Network-initiated adjustment of the PRS configuration, when adjusting the PRS configuration, the network device needs to consider the processing capacity of a target receiving device of the PRS configuration, and ensure that the adjusted length of the PRS does not exceed N=0.5 ms.

In some embodiments, when the PRS configuration corresponds to multiple target receiving devices, a limiting condition of the adjustment of the PRS configuration may take into account the weakest of all receiving devices in processing capacity, which is beneficial to ensure that all receiving devices can receive signals based on the adjusted PRS configuration.

In other embodiments, when there are multiple target receiving devices for the PRS configuration, the limiting condition of the adjustment of the PRS configuration may take into account the strongest of all receiving devices in processing capacity, which is beneficial to ensure that the receiving device with the strongest processing capability can receive the PRS, and other receiving devices can truncate the PRS before receiving.

In still other embodiments, when there are multiple target receiving devices for the PRS configuration, the limiting condition of the adjustment of the PRS configuration may take into account the median or average of processing capacities of all receiving devices, which is beneficial to guarantee PRS receiving performance of most receiving devices.

It should be understood that the above embodiment only takes the length of the single PRS as an example, which can also be replaced by other PRS configurations, such as the bandwidth of the PRS, the number of frequency layers, the number of TRPs, etc. That is, other PRS configurations should not exceed the processing capacity of the terminal device, and the measurement periodicity of the PRS should not be smaller than the time required by the terminal device to process the PRS, etc.

In other embodiments, the adjustment range of the PRS configuration needs to take into account the MG pattern supported by the terminal device. For example, the length of the PRS should preferably not exceed the maximum value of the MGL. Therefore, an excessive increase in the number of PRS can be avoided, and the measurement efficiency of PRSs can be improved.

For example, assuming that all MG patterns are supported by the terminal device, the maximum MGL is 6 ms, the length of the PRS configured by the network device should not exceed the MGL, otherwise it will lead to the waste of the PRS outside the MG.

As an example, for the UE-initiated adjustment of the PRS configuration, when the terminal device transmits the first request or the second request to request an increase in the length of the PRS, the requested length of the PRS should not exceed the MGL.

As another example, for the Network-initiated adjustment of the PRS configuration, when the network device adjusts the PRS configuration, it needs to consider the MG pattern of the target receiving device of the PRS configuration to ensure the receiving performance of the adjusted PRS configuration.

In some embodiments, when the PRS configuration corresponds to multiple target receiving devices, a limiting condition of the adjustment of the PRS configuration may take into account the minimum value of the MGL of all receiving devices, which is beneficial to ensure that all receiving devices can receive signals according to the adjusted PRS configuration.

In other embodiments, when there are multiple target receiving devices for the PRS configuration, the limiting condition of the adjustment of the PRS configuration may take into account the maximum value of the MGL of all receiving devices, which is beneficial to ensure that the receiving device with the strongest processing capability can receive the PRS, and other receiving devices can truncate the PRS before receiving.

In still other embodiments, when there are multiple target receiving devices for the PRS configuration, the limiting condition of the adjustment of the PRS configuration may take into account the median or average value of the MGL of all receiving devices, which is beneficial to guarantee PRS receiving performance of most receiving devices while taking into account the PRS efficiency.

It should be understood that the first information may be transmitted via any downlink signaling which the network device and the terminal device communicate.

In some embodiments, the first information is transmitted by at least one of: Radio Resource Control, RRC, signaling; a Media Access Control, MAC, Control Element, CE; or Downlink Control Information, DCI.

In other embodiments, the first information is carried by a first signaling. The first signaling is feedback signaling of the network device for the first request transmitted by the terminal device.

In some embodiments, the first request may be used for requesting the network device to adjust the PRS configuration and/or the PRS transmission level.

In some embodiments, the first signaling may include at least one of: request acknowledgement information of the PRS transmission level, request acknowledgement information of the PRS configuration, adjustment information of the MG pattern configuration, adjustment information of the MG sharing mechanism, and adjustment information of the measurement priority corresponding to the PRS.

In some embodiments, the first information is carried by a second signaling. The second signaling is a feedback signaling of the network device for a second request transmitted by the terminal device, and the second request is used for requesting an adjustment of the PRS configuration and the MG related configuration.

In some embodiments, the second request may be used for requesting the network device to adjust the PRS configuration and/or the PRS transmission level, and may also requesting the network device to adjust at least one of: the MG pattern configuration, the MG sharing mechanism configuration, or the measurement priority configuration for the PRS.

In some embodiments, the second signaling may include at least one of: request acknowledgement information of the PRS transmission level, request acknowledgement information of the PRS configuration, adjustment information of the MG pattern configuration, adjustment information of the MG sharing mechanism, and adjustment information of the measurement priority corresponding to the PRS.

In some embodiments, the first information is carried by a third signaling. The third signaling is used by the network device for adjusting the PRS configuration of the terminal device.

In some embodiments, the third signaling may include at least one of: adjustment information of the MG pattern configuration, adjustment information of the MG sharing mechanism, and adjustment information of the measurement priority corresponding to the PRS.

In embodiments of the present disclosure, the signaling for carrying the first information is collectively referred to as an adjustment signaling for ease of description and illustration.

The specific implementation of the first information will be described below in connection with specific embodiments.

In some embodiments of the present disclosure, the first information may include the adjusted MG related configuration.

It should be understood that part of the MG related configuration may be changed. For example, only the MG pattern configuration changes, or only the MGL in the MG pattern configuration changes, etc. Alternatively, all of the MG related configuration may be changed, which is not limited in the present disclosure.

In some embodiments, the first information may include only the changed part of MG related configuration. For example, if only the MGL is changed, the first information may include only the changed MGL.

In other embodiments, the first information includes an adjustment amount of the adjusted MG related configuration relative to an MG related configuration before adjustment.

In some embodiments, the first information may include an adjustment amount of the changed part of MG related configuration relative to the MG related configuration before the adjustment.

For example, when only the MGL is changed, the first information may only include an adjustment amount of the changed MGL relative to the MGL before the change.

By way of example and not limitation, the first information includes at least one of:

an adjustment amount corresponding to a periodicity of an MG in an MG pattern configuration, i.e., an adjustment amount of the MGRP;

an adjustment amount corresponding to a length of the MG in the MG pattern configuration, i.e., an adjustment amount of the MGL;

an adjustment amount corresponding to a start position offset of the MG, i.e., the adjustment amount of gapoffset;

an adjustment amount of a parameter corresponding to an MG sharing mechanism configuration; or an adjustment amount of a measurement priority of a PRS in the MG.

In some embodiments, the adjustment amount of the parameter corresponding to the MG sharing mechanism configuration may include the adjustment amount of measGapSharingScheme. For example, when adjusted from '00' to '01' in Table 1, the adjustment amount may be 1.

It should be understood that in embodiments of the present disclosure, the adjustment amount may be a difference between the adjusted MG related configuration and the MG related configuration before adjustment, or may also be a ratio of the adjusted MG related configuration to the MG related configuration before adjustment.

Taking the change of the MGRP as an example, the first information may include a first adjustment amount K1, and the first adjustment amount K1 may be a ratio relationship between an adjusted MGRP (denoted as MGRP_new) and an MGRP before adjustment (denoted as MGRP_old). That is, MGRP_new=K1*MGRP_old.

As an example, the value of K1 is one of $\{2, 4, 8, \frac{1}{2}, \frac{1}{4}, \frac{1}{8}\}$.

It should be understood that when the value of K1 is greater than 1, it means that the periodicity of the MG is increased, and when the value of K1 is smaller than 1, it means that the periodicity of the MG is decreased.

Taking the change of the MGL as an example, the first information may include a second adjustment amount K2, and the second adjustment amount K2 may be a numerical relationship between the adjusted MGL (denoted as MGL_new) and the MGL before adjustment (denoted as MGL_old).

For example, when the adjustment signaling indicates that MGL increases K2 ms, MGL_new=MGL_old+K2; or when the adjustment signaling indicates that MGL decreases K2 ms, MGL_new=MGL_old−K2.

In some embodiments, K2 may be positive, negative, or 0, so that when determining the adjusted MGL, the MGL before adjustment and K2 may be directly added. In other embodiments, K2 may be positive or 0, in which case a further indication is required of whether to increase or decrease the adjustment amount on the basis of the MGL before adjustment. The above implementation is also applicable to other adjustment amounts.

For example, the value of K2 may be one of a set of adjustment amounts. For example, the set of adjustment amounts may include sets $\{-1*S, S\}$, $\{S, 0\}$, or $\{-1*S, S, 0\}$. As an example, the set S may be $\{0.5, 1, 1.5, 2, 2.5, 3, 4, 4.5, 6, 6.5, 7, 8.5, 10, 14, 14.5, 16, 16.5, 17, 18.5\}$.

Taking the change of gapoffset as an example, the first information may include a third adjustment amount K3, and the third adjustment amount K3 may be a numerical relationship between the adjusted gapoffset (offset_new) and the gapoffset before adjustment. For example, gapoffset_new=gapoffset_old+K3. When K3 is positive, it means that gapoffset increases; when K3 is negative, it means that gapoffset decreases.

In some embodiments, a format of the adjustment signaling may be an adjustment object and an adjustment amount.

For example, when the adjustment object is the periodicity of the MG and the adjustment amount is K1 times, then MGRP_new=K1*MGRP_old.

In some embodiments, the adjusted MG sharing mechanism configuration may be indicated by a difference value.

For example, the parameter of MG sharing mechanism before adjustment is measGapSharingScheme=00, and the adjustment signaling indicates that 2 needs to be added, then the adjusted parameter is measGapSharingScheme=10.

In some embodiments, the adjusted measurement priority corresponding to the PRS may be indicated by a difference value.

For example, the measurement priority corresponding to the PRS before adjustment is 2, and the adjustment signaling indicates that it needs to be upgraded by 1, then the adjusted measurement priority is 1.

Figure 4:
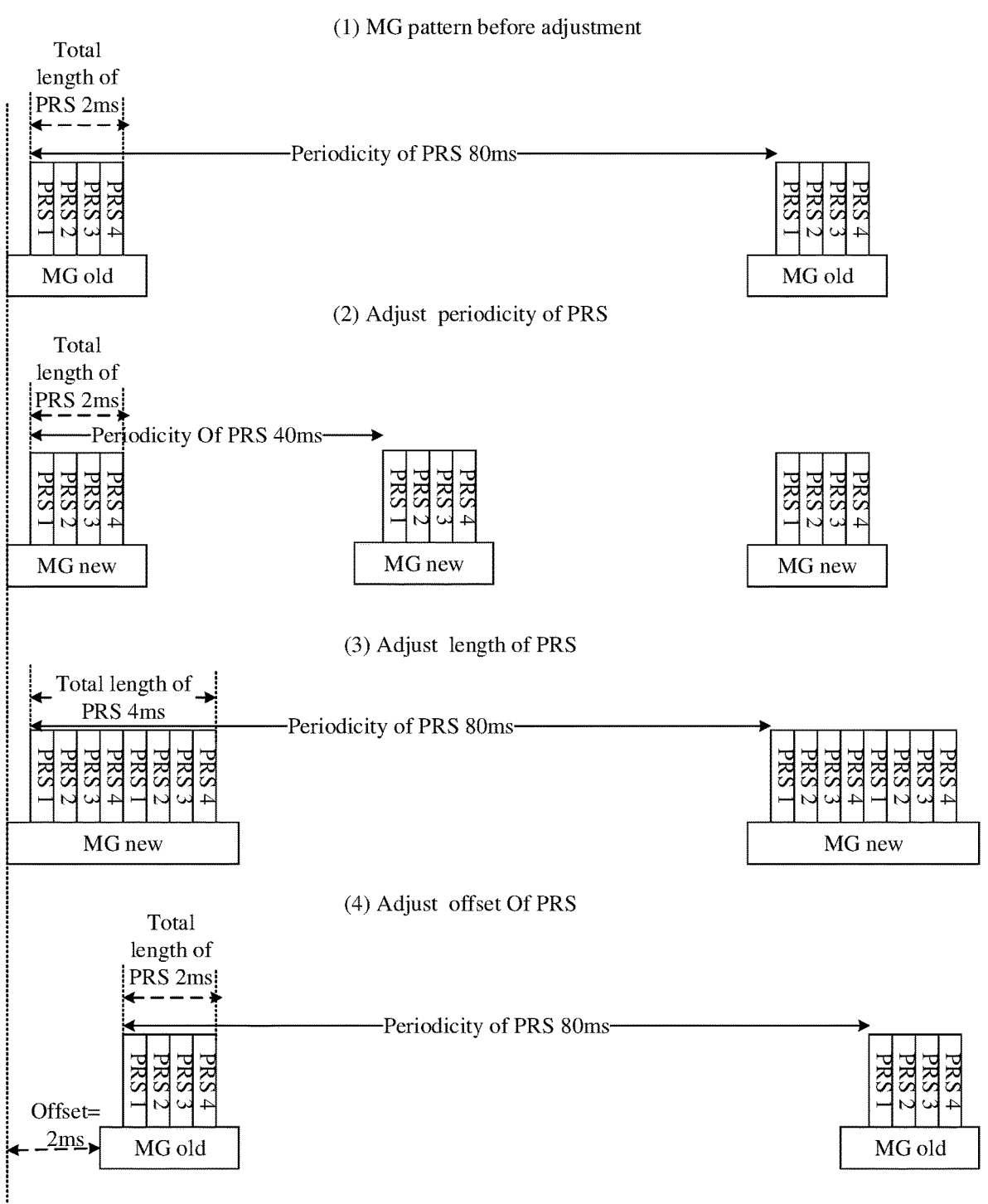
FIG. 4 is an adjustment mode diagram of an MG related configuration according to an exemplary embodiment of the present disclosure.

Illustratively, description will be made in conjunction with the example shown in FIG. 4.

Assuming that the PRS configuration before adjustment corresponds to the lowest PRS transmission level. For example, the PRS configuration corresponding to the lowest PRS transmission level is that the periodicity of the PRS is 80 ms, the PRS is repeated once in each periodicity, a total length of the corresponding signal is L=2 ms, etc., so the MG pattern configuration before adjustment (denoted as MG pattern old) is MGRP_old=80 ms, MGL_old=3 ms, and MGL_offset=0 ms. When more accurate positioning information needs to be obtained more quickly, the PRS transmission level needs to be upgraded, and correspondingly, the MG pattern configuration needs to be adjusted. In one feasible implementation, only the parts that need to be adjusted are indicated on the basis of the MG pattern old.

For example, the PRS transmission frequency is increased and the PRS transmission periodicity is changed to 40 ms. Then the MGRP also needs to be adjusted correspondingly. For example, the first information may include the first adjustment amount K1=½ for indicating that the periodicity of the MG is changed to K1=½ times the periodicity before adjustment, and then the adjusted MGRP_new=K1*MGRP_old=½*80=40 ms.

For example, when the number of repetitions of the PRS is increased, for example, when the number of repetitions is adjusted to 2, and the corresponding length of the PRS is L=4 ms, then the MGL needs to be correspondingly increased. For example, the first information may include the second adjustment amount K2=2 ms for indicating that the MGL is increased by K2=2 ms, then the MGL_new=MGL_old+K2=3+2=5 ms.

As another example, when a new frequency layer of the PRS is added, resulting in a final PRS offset of 2 ms, then a time domain offset position of the MG needs to be modified accordingly. For example, the first information may include the third adjustment amount K3=2 ms for indicating that the position of the MG is delayed by K3=2 ms, then the adjusted gapoffset_new=gapoffset_old+K3=0+2=2 ms.

In other embodiments, the first information includes at least one of:

an adjustment amount of a configuration index corresponding to an adjusted MG pattern configuration relative to a configuration index corresponding to an MG pattern configuration before adjustment; or an adjustment amount of a configuration index corresponding to an adjusted MG sharing mechanism configuration relative to a configuration index corresponding to an MG sharing mechanism configuration before adjustment.

In some embodiments, the configuration index corresponding to the MG pattern configuration is used for indicating an order position of the MG pattern configuration in an MG pattern configuration sequence. In some embodiments, the MG pattern configuration sequence is predefined or configured by the network device.

In some embodiments, a configuration index corresponding to the MG sharing mechanism configuration is used for indicating an order position of the MG sharing mechanism configuration in an MG sharing mechanism configuration sequence. In some embodiments, the MG sharing mechanism configuration sequence is predefined or configured by a network device.

As an example, the MG pattern configuration sequence is {MG pattern 0, MG pattern 1, MG pattern 2, MG pattern 3, . . . }, and the first information is used for indicating a relative relationship between the adjusted MG pattern configuration and the MG pattern configuration before adjustment in this sequence. For example, if the MG pattern configuration before adjustment is configured as an MG pattern 1, the first information may indicate that the adjustment object is the MG pattern configuration, and the adjustment amount is an addition of 1, then the adjusted MG pattern configuration is an MG pattern 2. Alternatively, if the first information can indicate that the adjustment object is an MG pattern configuration and the adjustment amount is a decreasing of 1, then the adjusted MG pattern configuration is an MG pattern 0.

As yet another example, the MG pattern configuration sequence includes: MG pattern #1 (MGRP=80 ms, MGL=6 ms), MG pattern #14 (MGRP=80 ms, MGL=5.5 ms), MG pattern #8 (MGRP=80 ms, MGL=4 ms), MG pattern #18 (MGRP=80 ms, MGL=3.5 ms), MG pattern #3 (MGRP=80 ms, MGL=3 ms), and MG pattern #22 (MGRP=80 ms, MGL=1.5 ms).

Here the MGRPs corresponding to the above MG patterns are the same, and the MGLs and the levels are in an descending order.

In one implementation, the first information indicates that the MGL is adjusted according to a change in the PRS configuration. For example, if MG pattern #8 is currently used, and the first information indicates that the MGL is promoted by one level, then the adjusted MG pattern is MG pattern #14; Or, if the MGL is reduced by two levels, the adjusted MG pattern is MG pattern #3.

As an example, the MG sharing mechanism configuration sequence is {sharingScheme_A, sharingScheme_B}, and the first information is used for indicating the relative relationship between the MG sharing mechanism configuration before adjustment and the adjusted MG sharing mechanism configuration in this sequence. For example, the MG sharing mechanism configuration before adjustment is sharingScheme_A, and the first information indicates that the MG sharing mechanism needs to be switched (or indicates that the MG sharing mechanism configuration is added by 1), which means that the adjusted MG sharing mechanism is sharingScheme_B.

In some embodiments, the method 300 further includes: determining, by the network device based on an adjusted PRS configuration, a PRS transmission level corresponding to the adjusted PRS configuration; and determining the adjusted MG related configuration based on the PRS transmission level corresponding to the adjusted PRS configuration, and generating the first information based on the adjusted MG related configuration.

As mentioned above, different PRS configurations can be associated with different PRS transmission levels, and the network device may determine the PRS transmission level corresponding to the adjusted PRS configuration based on the adjusted PRS configuration, and further determine the adjusted MG related configuration based on the PRS transmission level.

In some embodiments, the network device may determine the first information based on the PRS transmission level corresponding to the adjusted PRS configuration and an association relationship between the PRS transmission level and the MG related configuration.

Specifically, the terminal device may determine the adjusted MG related configuration based on the PRS transmission level corresponding to the adjusted PRS configuration in combination with the association relationship, and further transmit the first information to the terminal device for the terminal device to determine the adjusted MG related configuration.

As an example, the association relationship between the PRS transmission level and the MG related configuration includes at least one of:

an association relationship between the PRS transmission level and an MG pattern configuration;

an association relationship between the PRS transmission level and an MG sharing mechanism configuration; or an association relationship between the PRS transmission level and a measurement priority of a PRS in an MG.

As an example, the network device may determine the adjusted MG pattern configuration based on the PRS transmission level corresponding to the adjusted PRS configuration in combination with the association relationship between the PRS transmission level and the MG pattern configuration.

As an example, the network device may determine the adjusted MG sharing mechanism configuration based on the PRS transmission level corresponding to the adjusted PRS configuration in combination with the association relationship between the PRS transmission level and the MG sharing mechanism configuration.

As an example, the network device may determine the adjusted measurement priority of the PRS based on the PRS transmission level corresponding to the adjusted PRS configuration in combination with the association relationship between the PRS transmission level and the measurement priority corresponding to the PRS.

As an example, the association relationship between the PRS transmission level and the MG pattern configuration may include:

a PRS transmission level 1 (corresponding to a periodicity of the PRS of 160 ms, a length of the PRS L=2 ms, a bandwidth of 24 RB) being associated with an MG pattern #9 (MGRP=160 ms, MGL=4 ms);

a PRS transmission level 2 (corresponding to a periodicity of the PRS of 80 ms, a length of the PRS L=2 ms, a bandwidth of 96 RB) being associated with an MG pattern #8 (MGRP=80 ms, MGL=4 ms); and a PRS transmission level 3 (corresponding to a periodicity of the PRS 80 ms, a length of the PRS L=4 ms, a bandwidth of 96 RB) being associated with an MG pattern #1 (MGRP=80 ms, MGL=6 ms).

For example, when the PRS transmission level is adjusted from 1 to 3, the MG pattern is adjusted from the MG pattern #9 to the MG pattern #1 according to the association relationship.

In some embodiments of the application, the network device determines the adjusted MG pattern based on the adjusted PRS configuration. Similarly, the terminal device may also determine the adjusted MG pattern based on the adjusted PRS configuration.

In some embodiments of the present disclosure, different PRS parameter ranges of the PRS configuration correspond to different MG patterns.

In some embodiments of the present disclosure, the network device may configure parameter values for determining different PRS parameter ranges. That is, the network device may configure a division mode of the PRS parameter ranges of the PRS configuration. Or the parameter values may be predefined. That is, the division mode of the PRS parameter ranges of the PRS configuration may be predefined. The embodiment is described by taking the network device configuring the parameter values as an example, but the present disclosure is not limited thereto.

It should be understood that embodiments of the present disclosure do not limit the number of PRS parameter ranges of the PRS configuration. For example, different PRS configurations may be divided into two PRS parameter ranges according to the length of the PRS, or different PRS configurations may be divided into three PRS parameter ranges according to the periodicity of the PRS, etc.

It should also be understood that embodiments of the present disclosure do not limit to the PRS parameters used to divide the PRS parameter ranges. For example, the PRS parameter ranges may be divided according to the length of the PRS, or according to the periodicity of the PRS, or according to other PRS parameters, which is not limited by the present disclosure.

For example, the network device configures a first PRS length parameter Y=3 ms. A length of a PRS greater than Y corresponds to a first PRS parameter range, and a length of a PRS smaller than or equal to Y corresponds to a second PRS parameter range. The first PRS parameter range corresponds to the MG pattern #1, and the second PRS parameter range corresponds to the MG pattern #8.

For another example, the network device configures the first PRS length parameter Y1=3 ms and a second PRS length parameter Y2=5 m. A length of a PRS greater than Y2 corresponds to a first PRS parameter range, a length of a PRS greater than Y1 and smaller than or equal to Y2 corresponds to a second PRS parameter range, and a length of a PRS smaller than or equal to Y1 corresponds to a third PRS parameter range. The first PRS parameter range corresponds to the MG pattern #24, the second PRS parameter range corresponds to the MG pattern #5 and the second PRS parameter range corresponds to MG the pattern #9.

That is, the network device may determine the PRS parameter range to which the adjusted PRS configuration belongs based on the adjusted PRS configuration in combination with the parameter values for determining different PRS parameter ranges (for example, the aforementioned Y, Y1, or Y2), and further determine the adjusted MG pattern configuration based on the corresponding relationship between the PRS parameter range corresponding to the adjusted PRS configuration and the MG pattern.

As an example, the association relationship between the PRS transmission level and the MG sharing mechanism configuration may include:

a PRS transmission level 1 (corresponding to a periodicity of the PRS of 160 ms, a length of the PRS L=2 ms, a bandwidth of 24 RB) being associated with MeasGapSharingScheme=00;

a PRS transmission level 2 (corresponding to a periodicity of the PRS of 80 ms, a length of the PRS L=2 ms, a bandwidth of 96 RB) being associated with MeasGapSharingScheme=01; and a PRS transmission level 3 (corresponding to a periodicity of the PRS of 80 ms, a length of the PRS L=4 ms, a bandwidth of 96 RB) being associated with MeasGapSharingScheme=10.

For example, when the PRS transmission level is adjusted from 1 to 3, the MG sharing mechanism is adjusted from MeasGapSharingScheme=00 to MeasGapSharingScheme=10 based on the association relationship.

In some embodiments, the network device determines the adjusted MG sharing mechanism based on the adjusted PRS configuration. Similarly, the terminal device may also determine the adjusted MG sharing mechanism based on the adjusted PRS configuration.

In some embodiments, different PRS parameter ranges of the PRS configuration correspond to different MG sharing mechanisms. For example, the network device configures a first PRS length parameter Y=3 ms. A length of the PRS greater than Y corresponds to the first PRS parameter range, and a length of the PRS smaller than or equal to Y corresponds to the second PRS parameter range. The first PRS parameter range corresponds to MeasGapSharingScheme=01, and the second PRS parameter range corresponds to MeasGapSharingScheme=00.

For example, the network device configures a first PRS length parameter Y1=3 ms and a second PRS length parameter Y2=5 ms. A length of the PRS greater than Y2 corresponds to a first PRS parameter range, a length of the PRS greater than Y1 and smaller than or equal to Y2 corresponds to a second PRS parameter range, and a length of the PRS smaller than or equal to Y1 corresponds to a third PRS parameter range. The first PRS parameter range corresponds to MeasGapSharingScheme=10, the second PRS parameter range corresponds to MeasGapSharingScheme=01, and the third PRS parameter range corresponds to MeasGapSharingScheme=00.

That is, the network device may determine the PRS parameter range to which the adjusted PRS configuration belongs based on the adjusted PRS configuration in combination with the parameter values for determining different PRS parameter ranges (for example, the aforementioned Y, Y1, or Y2), and further determine the adjusted MG sharing mechanism based on a corresponding relationship between the PRS parameter range corresponding to the adjusted PRS configuration and the MG sharing mechanism.

As an example, the association relationship between the PRS transmission level and the measurement priority of the PRS may include:

a PRS transmission level 1 (corresponding to a periodicity of the PRS of 160 ms, a length of the PRS L=2 ms, a bandwidth of 24 RB) being associated with a low measurement priority, which means that the MG is preferentially used for a Radio Resource Management (RRM) measurement, and a PRS measurement is only performed when only the PRS is included in the MG;

a PRS transmission level 2 (corresponding a periodicity of the PRS of 80 ms, a length of the PRS L=2 ms, a bandwidth of 96 RB) being associated with a medium measurement priority, which means that the MG is used for the PRS measurement and the RRM measurement, and PRS and the PRS measurement and the RRM measurement compete with each other;

a PRS transmission level 3 (corresponding to a periodicity of the PRS of 80 ms, a length of the PRS L=4 ms, a bandwidth of 96 RB) being associated with a high measurement priority, which means that the MG is preferentially used for the PRS measurement, the PRS measurement is preferentially performed when the PRS is included in the MG, and the RRM measurement can only be performed when no PRS is included in the MG.

When the three PRS configurations are configured simultaneously, the measurement priority is the PRS transmission level 3>the PRS transmission level 2>the PRS transmission level 1.

In some embodiments, if the capability of the terminal device only supports the measurement for two PRS resources, only the PRS resource with a high priority may be measured according to the measurement priority order.

In some embodiments, different measurement priorities may correspond to different PRS configuration ranges. For example, the network device configures PRS parameters for distinguishing different measurement priorities. For example, a PRS length parameter Y=3 ms, a PRS periodicity parameter T=160 ms, etc. Then the terminal device determines the measurement priority of the PRS based on the configured PRS parameters. For example, if the length of the PRS is greater than Y and the periodicity is greater than T, the PRS is considered to correspond to the highest measurement priority.

In some embodiments, the network device determines the adjusted measurement priority of the PRS based on the adjusted PRS configuration. Similarly, the terminal device may also determine the adjusted measurement priority of the PRS based on the adjusted PRS configuration.

In some embodiments, different PRS configuration ranges of the PRS configuration correspond to different measurement priorities. For example, the network device configures a first PRS length parameter Y=3 ms. A length of the PRS greater than Y corresponds to the first PRS parameter range, and the length of the PRS smaller than or equal to Y corresponds to the second PRS parameter range. Here, the first PRS parameter range corresponds to the highest measurement priority and the second PRS parameter range corresponds to the lowest measurement priority.

For another example, the network device configures a first PRS length parameter Y1=3 ms and a second PRS length parameter Y2=5 ms. Here, the length of the PRS greater than Y2 corresponds to the first PRS parameter range, the length of the PRS greater than Y1 and smaller than or equal to Y2 corresponds to the second PRS parameter range, and the length of the PRS smaller than or equal to Y1 corresponds to the third PRS parameter range. Here, the first PRS parameter range corresponds to the highest measurement priority, the second PRS parameter range corresponds to the medium measurement priority, and the third PRS parameter range corresponds to the lowest measurement priority.

That is, the network device may determine the PRS parameter range to which the adjusted PRS configuration belongs based on the adjusted PRS configuration in combination with the parameter values for determining different PRS parameter ranges, and further determine the adjusted measurement priority based on the corresponding relationship between the PRS parameter range corresponding to the adjusted PRS configuration and the measurement priority.

It should be understood that in the embodiment of the present disclosure, the terminal device may also determine the adjusted MG related configuration based on the adjusted PRS configuration. The specific implementation refers to the related implementation of determining the adjusted MG related configuration by the network device based on the adjusted PRS configuration, which will not be repeated here for the sake of brevity.

In some embodiments, the terminal device measures the PRS based on the adjusted measurement priority corresponding to the PRS.

For example, the terminal device measures PRSs based on a measurement capability of the terminal device in an descending order of measurement priorities corresponding to the PRS s.

In some embodiments, the terminal device measures no PRS with low measurement priority, when the terminal device is incapable of measuring all PRSs based on the measurement capability of the terminal device. For example, if the measurement capability of the terminal device supports the measurement of two PRS resources and the adjusted PRS configuration includes three PRS resources, the terminal device can only measure two PRS resources with high measurement priorities and discard the PRS with the lowest measurement priority.

In some embodiments, as shown in FIG. 3, the method 300 further includes the following.

At S310, the network device transmits first indication information to the terminal device. The first indication information is used for indicating whether the terminal device is allowed to adjust an MG related configuration based on a PRS transmission level.

For example, the first indication information may be used for indicating at least one of:

whether the terminal device is allowed to adjust the MG pattern configuration based on the PRS transmission level;

whether the terminal device is allowed to adjust the MG sharing mechanism configuration based on the PRS transmission level; or whether the terminal device is allowed to adjust the measurement priority corresponding to the PRS based on the PRS transmission level.

In some embodiments, the terminal device may adjust the MG related configuration based on the transmission level corresponding to the adjusted PRS configuration, when the first indication information indicates that the terminal device is allowed to adjust the MG related configuration based on the PRS transmission level.

For example, the terminal device may adjust the MG pattern configuration based on the transmission level corresponding to the adjusted PRS configuration, when the first indication information indicates that the terminal device is allowed to adjust the MG pattern configuration based on the PRS transmission level.

For another example, the terminal device may adjust the MG sharing mechanism configuration based on the transmission level corresponding to the adjusted PRS configuration, when the first indication information indicates that the terminal device is allowed to adjust the MG sharing mechanism configuration based on the PRS transmission level.

For a further example, the terminal device may adjust the measurement priority corresponding to the PRS based on the transmission level of the adjusted PRS configuration, when the first indication information indicates that the terminal device is allowed to adjust the measurement priority corresponding to the PRS based on the PRS transmission level.

In some embodiments, whether the network device allows the terminal device to adjust the MG pattern configuration based on the PRS transmission level, adjust the MG sharing mechanism configuration based on the PRS transmission level, and adjust the measurement priority corresponding to the PRS based on the PRS transmission level may be indicated by same information or may also be indicated by different information, which is not limited in the present disclosure.

It should be understood that, in embodiments of the present disclosure, when the first information includes adjustment information for at least two MG related configurations among an MG pattern configuration, an MG sharing mechanism, and a measurement priority, the adjustment information may be transmitted to the terminal device by one signaling or may also be transmitted to the terminal device by a plurality of signalings, which is not limited herein.

In some embodiments, as shown in FIG. 3, the method further includes the following.

At S320, the network device receives second indication information transmitted by the terminal device. The second indication information is used for indicating whether the terminal device is capable of adjusting an MG related configuration based on a PRS transmission level.

For example, the network device may instruct the terminal device to adjust the MG related configuration based on the PRS transmission level, when the second indication information indicates that the terminal device is capable of adjusting the MG related configuration based on the PRS transmission level.

In some embodiments, the second indication information is used for indicating at least one of:

whether the terminal device is capable of adjusting the MG pattern configuration based on the PRS transmission level;

whether the terminal device is capable of adjusting the MG sharing mechanism configuration based on the PRS transmission level; or whether the terminal device is capable of adjusting the measurement priority of the PRS based on the PRS transmission level.

In some embodiments, the second indication information may be reported to the network device together with capability-related information as the terminal device reports the capability-related information to the network device.

In some embodiments, the method 300 further includes the following.

At S330, the network device transmits third indication information to the terminal device. The third indication information is used for indicating a determination mode of a PRS transmission level.

For example, the network device can configure the PRS parameter Y to the terminal device, for example, Y=3 ms, which means that when the length of the PRS is greater than Y, it corresponds to the PRS transmission level 1, and when the length of the PRS is smaller than or equal to Y, it corresponds to the PRS transmission level 2.

For another example, the network device may configure the aforementioned PRS parameters Y1 and Y2 to the terminal device. For example, Y1=3 ms and Y2=5 ms. Here the length of the PRS greater than Y2 corresponds to the PRS transmission level 1, the length of the PRS greater than Y1 and smaller than or equal to Y2 corresponds to the PRS transmission level 2, and the length of the PRS smaller than or equal to Y1 corresponds to the PRS transmission level 3.

It should be understood that in embodiments of the present disclosure, the first indication information, the second indication information, and the third indication information may be carried by existing signaling or may be newly added signaling, which is not limited in embodiments of the present disclosure.

To sum up, when the PRS configuration of the terminal device is changed, the network device can transmit the first information to the terminal device, and the first information is used for the terminal device to determine the changed MG related configuration. In this way, the terminal device can perform the PRS measurement based on the changed MG related configuration, which is beneficial to improving the measurement efficiency of the PRS.

FIG. 5 is a schematic flowchart of a wireless communication method 200 according to an embodiment of the present disclosure. As shown in FIG. 5, the method 200 including the following.

At S210, the terminal device determines the adjusted MG related configuration based on the adjusted PRS configuration.

It should be understood that the relevant implementation of the method 200 may refer to the corresponding steps of the method 300, which will not be repeated for the sake of brevity.

In some embodiments, the PRS configuration includes at least one of: whether a PRS is transmitted; a number of frequency layers of the PRS; a length of the PRS in each frequency layer; a bandwidth of the PRS in each frequency layer; a number of TRPs transmitting the PRS in each frequency layer; a transmission periodicity of the PRS; a number of repetitions of the PRS; or a number of symbols occupied by the PRS in each frequency layer. Alternatively, it may include PRS configurations newly introduced in the evolution of standards, such as PRS aggregation level or PRS aggregation configuration, etc. The present disclosure is not limited thereto.

In some embodiments, the MG related configuration includes at least one of: an MG pattern configuration; an MG sharing mechanism configuration; or a measurement priority configuration for a PRS in an MG.

In some embodiments, the method 200 further includes:

determining, by the terminal device based on the adjusted PRS configuration, a PRS transmission level corresponding to the adjusted PRS configuration; and determining the adjusted MG related configuration based on the PRS transmission level corresponding to the adjusted PRS configuration.

In some embodiments, said determining the adjusted MG related configuration based on the PRS transmission level corresponding to the adjusted PRS configuration includes:

determining the first information based on the PRS transmission level corresponding to the adjusted PRS configuration and an association relationship between the PRS transmission level and the MG related configuration.

In some embodiments, the association relationship between the PRS transmission level and the MG related configuration includes at least one of:

an association relationship between the PRS transmission level and an MG pattern configuration;

an association relationship between the PRS transmission level and an MG sharing mechanism configuration; or an association relationship between the PRS transmission level and a measurement priority of a PRS in an MG.

In some embodiments, the method further includes: receiving, by the terminal device, first indication information transmitted by the network device. The first indication information is used for indicating whether the terminal device is allowed to adjust an MG related configuration based on the PRS transmission level.

In some embodiments, the method further includes: determining, by the terminal device in response to the first indication information indicating that the terminal device is allowed to adjust the MG related configuration based on the PRS transmission level, the adjusted MG related configuration based on the PRS transmission level corresponding to the adjusted PRS configuration.

In some embodiments, the method further includes: transmitting, by the terminal device, second indication information to the network device. The second indication information is used for indicating whether the terminal device is capable of adjusting an MG related configuration based on a PRS transmission level.

In some embodiments, the method further includes: determining, by the terminal device in response to the second indication information indicating that the terminal device is capable of adjusting the MG related configuration based on the PRS transmission level, the adjusted MG related configuration based on the PRS transmission level corresponding to the adjusted PRS configuration.

In some embodiments, the method further includes: receiving, by the terminal device, third indication information transmitted by the network device. The third indication information is used for indicating a determination mode of a PRS transmission level.

In some embodiments, the method 200 further includes: measuring, by the terminal device, a PRS based on an adjusted measurement priority corresponding to an PRS.

In some embodiments, said measuring, by the terminal device, the PRS based on the adjusted measurement priority corresponding to the PRS includes: measuring, by the terminal device, PRSs based on a measurement capability of the terminal device in an descending order of measurement priorities corresponding to the PRSs.

In some embodiments, said measuring, by the terminal device, the PRSs based on the measurement capability of the terminal device in accordance with the measurement priorities corresponding to the PRSs includes: measuring, by the terminal device, no PRS with low measurement priority when the terminal device is incapable of measuring all PRSs based on the measurement capability of the terminal device.

The method embodiments of the present disclosure have been described in detail above with reference to FIG. 3 to FIG. 5, and the apparatus embodiments of the present disclosure have been described in detail below with reference to FIG. 6 to FIG. 10. It should be understood that the apparatus embodiments and the method embodiments correspond to each other, and similar descriptions may refer to the method embodiments.

FIG. 6 is a schematic block diagram of a network device 400 according to an embodiment of the present disclosure. As shown in FIG. 6, the network device 400 includes: a communication unit 410 configured to transmit first information to a terminal device in response to a PRS configuration being changed. The first information is used by the terminal device for determining an adjusted MG related configuration.

In some embodiments, the PRS configuration includes at least one of: whether a PRS is transmitted; a number of frequency layers of the PRS; a length of the PRS in each frequency layer; a bandwidth of the PRS in each frequency layer; a number of TRPs transmitting the PRS in each frequency layer; a transmission periodicity of the PRS; a number of repetitions of the PRS; or a number of symbols occupied by the PRS in each frequency layer. Alternatively, it may include PRS configurations newly introduced in the evolution of standards, such as PRS aggregation level or PRS aggregation configuration, etc. The present disclosure is not limited thereto.

In some embodiments, the MG related configuration includes at least one of: an MG pattern configuration; an MG sharing mechanism configuration; or a measurement priority configuration for a PRS in an MG.

In some embodiments, the first information is transmitted by at least one of: RRC signaling; an MAC CE; or DCI.

In some embodiments, the first information is carried by a first signaling. The first signaling is a feedback signaling of the network device for a first request transmitted by the terminal device. The first request is used for requesting an adjustment to the PRS configuration.

In some embodiments, the first information is carried by a second signaling. The second signaling is a feedback signaling of the network device for a second request transmitted by the terminal device. The second request is used for requesting an adjustment to the PRS configuration and the MG related configuration.

In some embodiments, the first information is carried by a third signaling. The third signaling is used by the network device for adjusting the PRS configuration of the terminal device.

In some embodiments, the first information includes an adjustment amount of the adjusted MG related configuration relative to an MG related configuration before adjustment.

In some embodiments, the first information includes at least one of:

an adjustment amount corresponding to a periodicity of an MG in an MG pattern configuration;

an adjustment amount corresponding to a length of the MG in the MG pattern configuration;

an adjustment amount corresponding to a start position offset of the MG;

an adjustment amount of a parameter corresponding to an MG sharing mechanism configuration; or an adjustment amount of a measurement priority of a PRS in the MG.

In some embodiments, the first information includes at least one of:

an adjustment amount of a configuration index corresponding to an adjusted MG pattern configuration relative to a configuration index corresponding to an MG pattern configuration before adjustment; or an adjustment amount of a configuration index corresponding to an adjusted MG sharing mechanism configuration relative to a configuration index corresponding to an MG sharing mechanism configuration before adjustment.

In some embodiments, the configuration index corresponding to the MG pattern configuration is used for indicating an order position of the MG pattern configuration in an MG pattern configuration sequence, the MG pattern configuration sequence being predefined or configured by the network device.

In some embodiments, the configuration index corresponding to the MG sharing mechanism configuration is used for indicating an order position of the MG sharing mechanism configuration in an MG sharing mechanism configuration sequence, the MG sharing mechanism configuration sequence being predefined or configured by the network device.

In some embodiments, the network device further includes: a processing unit configured to determine, based on an adjusted PRS configuration, a PRS transmission level corresponding to the adjusted PRS configuration; and determine the first information based on the PRS transmission level corresponding to the adjusted PRS configuration.

In some embodiments, the processing unit is further configured to determine the first information based on the PRS transmission level corresponding to the adjusted PRS configuration and an association relationship between the PRS transmission level and the MG related configuration.

In some embodiments, the association relationship between the PRS transmission level and the MG related configuration includes at least one of:

an association relationship between the PRS transmission level and an MG pattern configuration;

an association relationship between the PRS transmission level and an MG sharing mechanism configuration; or an association relationship between the PRS transmission level and a measurement priority of a PRS in an MG.

In some embodiments, the communication unit 410 is further configured to transmit first indication information to the terminal device. The first indication information is used for indicating whether the terminal device is allowed to adjust an MG related configuration based on a PRS transmission level.

In some embodiments, the communication unit 410 is further configured to receive second indication information transmitted by the terminal device. The second indication information is used for indicating whether the terminal device is capable of adjusting an MG related configuration based on a PRS transmission level.

In some embodiments, the communication unit 410 is further configured to transmit third indication information to the terminal device. The third indication information is used for indicating a determination mode of a PRS transmission level.

In some embodiments, the first information includes the adjusted MG related configuration.

In some embodiments, the communication unit may be a communication interface or a transceiver, or an input-output interface of a communication chip or a system-on-chip. The processing unit may be one or more processors.

It should be understood that the terminal device 400 according to the embodiment of the present disclosure may correspond to the terminal device in the method embodiments of the present disclosure. The above and other operations and/or functions of individual unit in the network device 400 are respectively for implementing the corresponding process performed by the network device in the method 300 shown in FIG. 3, which will not be repeated for the sake of brevity.

FIG. 7 is a schematic block diagram of a terminal device according to an embodiment of the present disclosure. The terminal device 500 of FIG. 7 includes: a communication unit 510 configured to receive first information transmitted by a network device in response to a PRS configuration being changed. The first information is used by the terminal device for determining an adjusted MG related configuration.

In some embodiments, the PRS configuration includes at least one of: whether a PRS is transmitted; a number of frequency layers of the PRS; a length of the PRS in each frequency layer; a bandwidth of the PRS in each frequency layer; a number of TRPs transmitting the PRS in each frequency layer; a transmission periodicity of the PRS; a number of repetitions of the PRS; or a number of symbols occupied by the PRS in each frequency layer. Alternatively, it may include PRS configurations newly introduced in the evolution of standards, such as PRS aggregation level or PRS aggregation configuration, etc. The present disclosure is not limited thereto.

In some embodiments, the MG related configuration includes at least one of: an MG pattern configuration; an MG sharing mechanism configuration; or a measurement priority configuration for a PRS in an MG.

In some embodiments, the first information is transmitted by at least one of: RRC signaling; an MAC CE; or DCI.

In some embodiments, the first information is carried by a first signaling. The first signaling is a feedback signaling of the network device for a first request transmitted by the terminal device. The first request is used for requesting an adjustment to the PRS configuration.

In some embodiments, the first information is carried by a second signaling. The second signaling is a feedback signaling of the network device for a second request transmitted by the terminal device. The second request is used for requesting an adjustment to the PRS configuration and the MG related configuration.

In some embodiments, the first information is carried by a third signaling. The third signaling is used for the network device to adjust the PRS configuration of the terminal device. The second request is used for requesting an adjustment to the PRS configuration and the MG related configuration.

In some embodiments, the first information includes an adjustment amount of the adjusted MG related configuration relative to an MG related configuration before adjustment.

In some embodiments, the first information includes at least one of:

an adjustment amount corresponding to a periodicity of an MG in an MG pattern configuration;

an adjustment amount corresponding to a length of the MG in the MG pattern configuration;

an adjustment amount corresponding to a start position offset of the MG;

an adjustment amount of a parameter corresponding to an MG sharing mechanism configuration; or an adjustment amount of a measurement priority of a PRS in the MG.

In some embodiments, the first information includes at least one of:

an adjustment amount of a configuration index corresponding to an adjusted MG pattern configuration relative to a configuration index corresponding to an MG pattern configuration before adjustment; or an adjustment amount of a configuration index corresponding to an adjusted MG sharing mechanism configuration relative to a configuration index corresponding to an MG sharing mechanism configuration before adjustment.

In some embodiments, the configuration index corresponding to the MG pattern configuration is used for indicating an order position of the MG pattern configuration in an MG pattern configuration sequence, the MG pattern configuration sequence being predefined or configured by the network device.

In some embodiments, the configuration index corresponding to the MG sharing mechanism configuration is used for indicating an order position of the MG sharing mechanism configuration in an MG sharing mechanism configuration sequence, the MG sharing mechanism configuration sequence being predefined or configured by the network device.

In some embodiments, the communication unit 510 is further configured to receive first indication information transmitted by the network device. The first indication information is used for indicating whether the terminal device is allowed to adjust an MG related configuration based on a PRS transmission level.

In some embodiments, the communication unit 510 is further configured to determine, in response to the first indication information indicating that the terminal device is not allowed to adjust an MG related configuration based on a PRS transmission level, the adjusted MG related configuration based on the first information.

In some embodiments, the communication unit 510 is further configured to transmit second indication information to the network device. The second indication information is used for indicating whether the terminal device is capable of adjusting an MG related configuration based on a PRS transmission level.

In some embodiments, the terminal device further include a processing unit configured to determine, in response to the second indication information indicating that the terminal device is incapable of adjusting the MG related configuration based on the PRS transmission level, the adjusted MG related configuration based on the adjusted PRS configuration.

In some embodiments, the communication unit 510 is further configured to receive third indication information transmitted by the network device. The third indication information is used for indicating a determination mode of a PRS transmission level.

In some embodiments, the terminal device further includes a processing unit is configured to measure a PRS based on an adjusted measurement priority corresponding to a PRS.

In some embodiments, the processing unit is specifically configured to measure PRSs based on a measurement capability of the terminal device in an descending order of measurement priorities corresponding to the PRSs.

In some embodiments, the processing unit is further configured to measure no PRS with low measurement priority, when the terminal device is incapable of measuring all PRSs based on the measurement capability of the terminal device.

In some embodiments, the communication unit may be a communication interface or a transceiver, or an input-output interface of a communication chip or a system-on-chip. The processing unit may be one or more processors.

It should be understood that the terminal device 500 according to the embodiment of the present disclosure may correspond to the terminal device in the method embodiments of the present disclosure. The above and other operations and/or functions of individual unit in the network device 500 are respectively for implementing the corresponding process performed by the network device in the method 300 shown in FIG. 3, which will not be repeated for the sake of brevity.

FIG. 8 is a schematic block diagram of a terminal device according to an embodiment of the present disclosure. The terminal device 800 of FIG. 8 includes a processing unit 810 configured to determine an adjusted MG related configuration based on an adjusted PRS configuration.

In some embodiments of the present disclosure, the PRS configuration includes at least one of: whether a PRS is transmitted; a number of frequency layers of the PRS; a length of the PRS in each frequency layer; a bandwidth of the PRS in each frequency layer; a number of TRPs transmitting the PRS in each frequency layer; a transmission periodicity of the PRS; a number of repetitions of the PRS; or a number of symbols occupied by the PRS in each frequency layer. Alternatively, it may include PRS configurations newly introduced in the evolution of standards, such as PRS aggregation level or PRS aggregation configuration, etc. The present disclosure is not limited thereto.

In some embodiments of the present disclosure, the MG related configuration includes at least one of: an MG pattern configuration; an MG sharing mechanism configuration; or a measurement priority configuration for a PRS in an MG.

In some embodiments of the present disclosure, the processing unit 810 is further configured to: determine a PRS transmission level corresponding to the adjusted PRS configuration based on the adjusted PRS configuration; and determine the adjusted MG related configuration based on the PRS transmission level corresponding to the adjusted PRS configuration.

In some embodiments of the present disclosure, the processing unit 810 is further configured to determine the adjusted MG related configuration based on the PRS transmission level corresponding to the adjusted PRS configuration and an association relationship between the PRS transmission level and the MG related configuration.

In some embodiments of the present disclosure, the association relationship between the PRS transmission level and the MG related configuration includes at least one of:

an association relationship between the PRS transmission level and an MG pattern configuration;

an association relationship between the PRS transmission level and an MG sharing mechanism configuration; or an association relationship between the PRS transmission level and a measurement priority of a PRS in an MG.

In some embodiments of the present disclosure, the terminal device further includes a communication unit configured to receive first indication information transmitted by the network device. The first indication information is used for indicating whether the terminal device is allowed to adjust an MG related configuration based on the PRS transmission level.

In some embodiments of the present disclosure, the processing unit 810 is further configured to determine, in response to the first indication information indicating that the terminal device is allowed to adjust the MG related configuration based on the PRS transmission level, the adjusted MG related configuration based on the PRS transmission level corresponding to the adjusted PRS configuration.

In some embodiments of the present disclosure, the terminal device further includes the communication unit configured to transmit second indication information to the network device. The second indication information is used for indicating whether the terminal device is capable of adjusting an MG related configuration based on a PRS transmission level.

In some embodiments of the present disclosure, the processing unit 810 is further configured to determine, in response to the second indication information indicating that the terminal device is capable of adjusting the MG related configuration based on the PRS transmission level, the adjusted MG related configuration based on the PRS transmission level corresponding to the adjusted PRS configuration.

In some embodiments of the present disclosure, the terminal device further includes the communication unit configured to receive third indication information transmitted by the network device. The third indication information is used for indicating a determination mode of a PRS transmission level.

In some embodiments of the present disclosure, the processing unit 810 is further configured to measure a PRS based on an adjusted measurement priority corresponding to an PRS.

In some embodiments of the present disclosure, the processing unit 810 is further configured to measure PRSs based on a measurement capability of the terminal device in an descending order of measurement priorities corresponding to the PRSs.

In some embodiments of the present disclosure, the processing unit 810 is specifically configured to measure no PRS with low measurement priority when the terminal device is incapable of measuring all PRSs based on the measurement capability of the terminal device.

In some embodiments of the present disclosure, the communication unit may be a communication interface or a transceiver, or an input-output interface of a communication chip or a system-on-chip. The processing unit may be one or more processors.

It should be understood that the terminal device 800 according to the embodiment of the present disclosure may correspond to the terminal device in the method embodiments of the present disclosure. The above and other operations and/or functions of individual unit in the network device 800 are respectively for implementing the corresponding process performed by the network device in the method 200 shown in FIG. 5, which will not be repeated for the sake of brevity.

Figure 9:
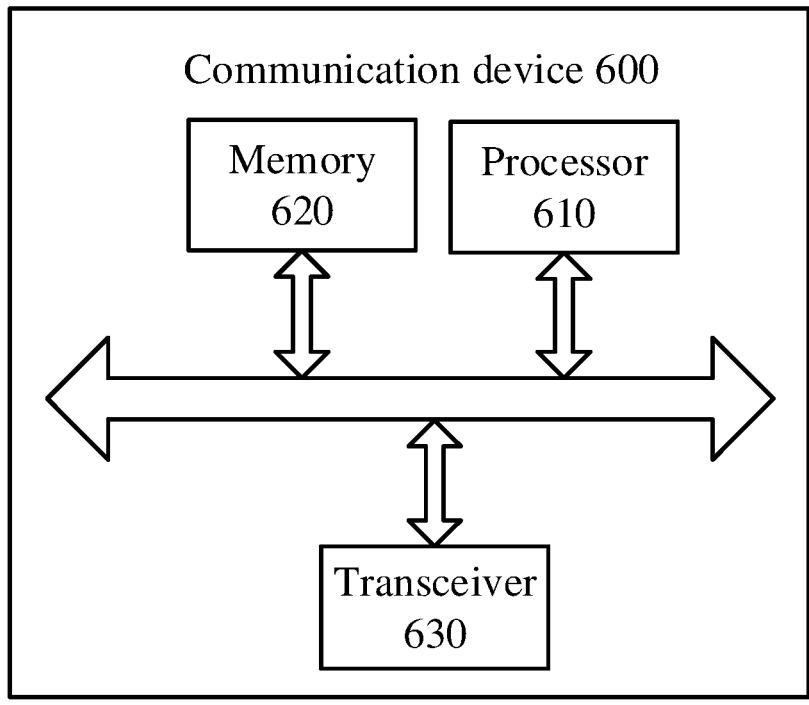
FIG. 9 is a schematic block diagram of a communication device according to an embodiment of the present disclosure.

FIG. 9 is a schematic block diagram of a communication device 600 according to an embodiment of the present disclosure. The communication device 600 shown in FIG. 9 includes a processor 610. The processor 610 is configured to invoke and run a computer program from a memory to perform the method according to any one of the embodiments of the present disclosure.

In some embodiments of the present disclosure as shown in FIG. 9, the communication device 600 may further include a memory 620. The processor 610 may invoke and run a computer program from the memory 620 to perform the method according to any one of the embodiments of the present disclosure.

Here, the memory 620 may be a separate component independent of the processor 610, or may be integrated in the processor 610.

In some embodiments of the present disclosure, as shown in FIG. 9, the communication device 600 may further include a transceiver 630. The processor 610 may control the transceiver 630 to communicate with other devices, specifically, to transmit information or data to other devices, or receive information or data transmitted by other devices.

Here, the transceiver 630 may include a transmitter and a receiver. The transceiver 630 may further include one or more antennas.

In some embodiments of the present disclosure, the communication device 600 may specifically be a network device according to the embodiment of the present disclosure. The communication device 600 may execute corresponding processes implemented by the network device in the method according to any one of the embodiments of the present disclosure. For brevity, details thereof will be omitted herein.

In some embodiments of the present disclosure, the communication device 600 may specifically be the mobile terminal/the terminal device any one of the embodiments of the present disclosure. The communication device 600 may implement corresponding processes implemented by the terminal device in the method according to any one of the embodiments of the present disclosure. For brevity, details thereof will be omitted herein.

Figure 10:
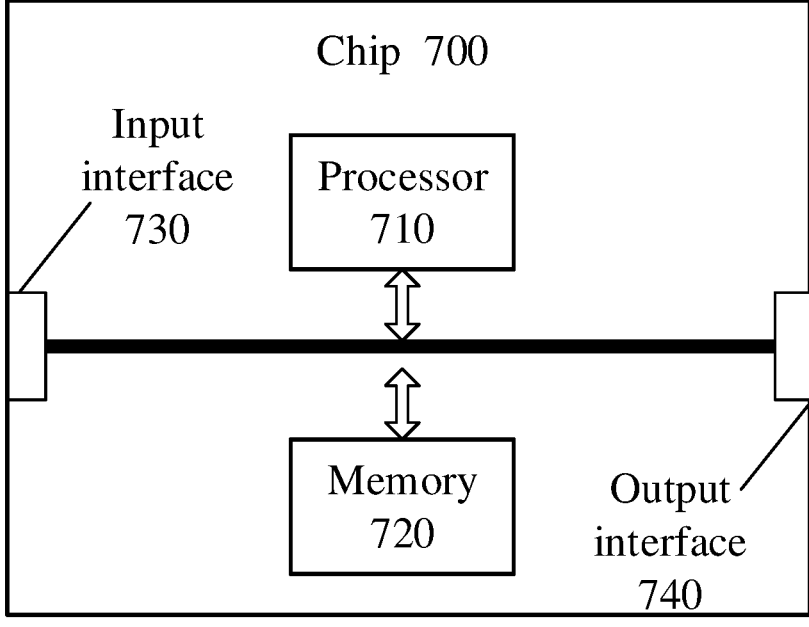
FIG. 10 is a schematic block diagram of a chip according to an embodiment of the present disclosure.

FIG. 10 is a schematic block diagram of a chip according to an embodiment of the present disclosure. As shown in FIG. 10, a chip 700 includes a processor 710. The processor 710 can invoke and run a computer program from a memory to perform the method according to any one of the embodiments of the present disclosure.

In some embodiments of the present disclosure as shown in FIG. 10, the chip 700 may further include a memory 720. The processor 710 may invoke and run a computer program from the memory 720 to perform the method according to any one of the embodiments of the present disclosure.

Here, the memory 720 may be a separate component independent of the processor 710, or may be integrated in the processor 710.

In some embodiments of the present disclosure, the chip 700 may further include an input interface 730. The processor 710 can control the input interface 730 to communicate with other devices or chips, specifically, to obtain information or data transmitted by other devices or chips.

In some embodiments of the present disclosure, the chip 700 may further include an output interface 740. The processor 710 can control the output interface 740 to communicate with other devices or chips, specifically, to output information or data to other devices or chips.

In some embodiments of the present disclosure, the chip can be applied to the network device according to any one of the embodiments of the present disclosure. In addition, the chip can implement corresponding processes implemented by the network device in the method according to any one of the embodiments of the present disclosure. For brevity, details thereof will be omitted herein.

In some embodiments of the present disclosure, the chip can be applied to the mobile terminal/terminal device according to the embodiments of the present disclosure, and the chip can implement corresponding processes implemented by the mobile terminal/terminal device in the method according to any one of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

It should be understood that the processor according to an embodiment of the present disclosure may be an integrated circuit chip having signal processing capabilities. In an implementation, actions of the above method may be accomplished by an integrated logic circuit in hardware in the processor or by instructions in the form of software. The above processor may be a general-purpose processor, a Digital Signal processor (DSP), an Application Specific Integrated Circuit (ASIC), a Field-Programmable Gate Array (FPGA) or other programmable logic devices, a discrete gate or a transistor logic device, or a discrete hardware component. The method, actions, and logic block diagrams according to any one of the embodiments of the present disclosure may be implemented or performed. The general-purpose processor may be a microprocessor, or the processor may further be any conventional processor, etc. The actions of the method disclosed in combination with any one of the embodiments of the present disclosure may be directly embodied as performed by a hardware decoding processor or performed by a combination of a hardware module and a software module in a decoding processor. The software module may be located in a random memory, a flash memory, a read-only memory, a programmable read-only memory or an electrically erasable programmable memory, a register, and other storage media mature in the art. The storage medium is located in the memory. The processor reads information in the memory and completes the actions of the above method in combination with the hardware.

It is understood that the memory according to the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which serves as an external cache. By way of illustration, but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM) or the like. It should be noted that the memory in the system and the method described herein is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM) or the like. That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any one of the embodiments of the present disclosure. Details thereof will be omitted here for simplicity.

In some embodiments of the present disclosure, the computer readable storage medium can be applied to the mobile terminal/terminal device in the embodiment of the present disclosure, and the computer program can cause a computer to perform corresponding procedures implemented by the mobile terminal/terminal device in the method according to any one of the embodiments of the present disclosure. Details thereof will be omitted here for simplicity.

An embodiment of the present disclosure also provides a computer program product including computer program instructions.

In some embodiments of the present disclosure, the computer program product can be applied to the network device in the embodiment of the present disclosure, and the computer program instructions can cause a computer to perform corresponding procedures implemented by the network device in the method according to any one of the embodiments of the present disclosure. Details thereof will be omitted here for simplicity.

In some embodiments of the present disclosure, the computer program product can be applied to the mobile terminal/terminal device in the embodiment of the present disclosure, and the computer program instructions can cause a computer to perform corresponding procedures implemented by the mobile terminal/terminal device in the method according to any one of the embodiments of the present disclosure. Details thereof will be omitted here for simplicity.

An embodiment of the present disclosure also provides a computer program.

In some embodiments of the present disclosure, the computer program can be applied to the network device in the embodiment of the present disclosure. The computer program, when executed on a computer, can cause the computer to perform corresponding procedures implemented by the network device in the method according to any one of the embodiments of the present disclosure. Details thereof will be omitted here for simplicity.

In some embodiments of the present disclosure, the computer program can be applied to the mobile terminal/terminal device in the embodiment of the present disclosure. The computer program, when executed on a computer, can cause the computer to perform corresponding procedures implemented by the mobile terminal/terminal device in the method according to any one of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
transmitting, by a network device, first information to a terminal device in response to a Positioning Reference Signal (PRS) configuration being changed, the first information being used by the terminal device for determining an adjusted Measurement Gap (MG) related configuration;
wherein the first information comprises an adjustment amount of the adjusted MG related configuration relative to an MG related configuration before adjustment;
wherein the first information comprises at least one of:
an adjustment amount of a configuration index corresponding to an adjusted MG pattern configuration relative to a configuration index corresponding to an MG pattern configuration before adjustment; or
an adjustment amount of a configuration index corresponding to an adjusted MG sharing mechanism configuration relative to a configuration index corresponding to an MG sharing mechanism configuration before adjustment.

2. The method according to claim 1, wherein the PRS configuration comprises at least one of:
whether a PRS is transmitted;
a number of frequency layers of the PRS;

a length of the PRS in each frequency layer;
a bandwidth of the PRS in each frequency layer;
a number of Transmission Reception Points (TRPs) transmitting the PRS in each frequency layer;
a transmission periodicity of the PRS;
a number of repetitions of the PRS; or
a number of symbols occupied by the PRS in each frequency layer, and/or
an MG related configuration comprises at least one of:
an MG pattern configuration;
an MG sharing mechanism configuration; or
a measurement priority configuration for a PRS in an MG.

3. The method according to claim 1, wherein
the first information is carried by a first signaling, wherein the first signaling is a feedback signaling of the network device for a first request transmitted by the terminal device, the first request being used for requesting an adjustment to the PRS configuration, or
the first information is carried by a second signaling, wherein the second signaling is a feedback signaling of the network device for a second request transmitted by the terminal device, the second request being used for requesting an adjustment to the PRS configuration and an MG related configuration, or
the first information is carried by a third signaling, the third signaling being used by the network device for adjusting the PRS configuration of the terminal device.

4. The method according to claim 1, wherein the first information comprises at least one of:
an adjustment amount corresponding to a periodicity of an MG in an MG pattern configuration;
an adjustment amount corresponding to a length of the MG in the MG pattern configuration;
an adjustment amount corresponding to a start position offset of the MG;
an adjustment amount of a parameter corresponding to an MG sharing mechanism configuration; or
an adjustment amount of a measurement priority of a PRS in the MG.

5. The method according to claim 1, wherein the configuration index corresponding to the MG pattern configuration is used for indicating an order position of the MG pattern configuration in an MG pattern configuration sequence, the MG pattern configuration sequence being predefined or configured by the network device, and/or
the configuration index corresponding to the MG sharing mechanism configuration is used for indicating an order position of the MG sharing mechanism configuration in an MG sharing mechanism configuration sequence, the MG sharing mechanism configuration sequence being predefined or configured by the network device.

6. The method according to claim 1, further comprising:
determining, by the network device based on an adjusted PRS configuration, a PRS transmission level corresponding to the adjusted PRS configuration; and
determining the first information based on the PRS transmission level corresponding to the adjusted PRS configuration.

7. The method according to claim 6, wherein said determining the first information based on the PRS transmission level corresponding to the adjusted PRS configuration comprises:
determining the first information based on the PRS transmission level corresponding to the adjusted PRS configuration and an association relationship between the PRS transmission level and the MG related configuration.

8. The method according to claim 7, wherein the association relationship between the PRS transmission level and the MG related configuration comprises at least one of:

an association relationship between the PRS transmission level and an MG pattern configuration;

an association relationship between the PRS transmission level and an MG sharing mechanism configuration; or an association relationship between the PRS transmission level and a measurement priority of a PRS in an MG.

9. The method according to claim 1, further comprising at least one of:

transmitting, by the network device, first indication information to the terminal device, the first indication information being used for indicating whether the terminal device is allowed to adjust an MG related configuration based on a PRS transmission level, receiving, by the network device, second indication information transmitted by the terminal device, the second indication information being used for indicating whether the terminal device is capable of adjusting an MG related configuration based on a PRS transmission level, or transmitting, by the network device, third indication information to the terminal device, the third indication information being used for indicating a determination mode of a PRS transmission level.

10. A network device, comprising a processor and a memory, wherein the memory is configured to store a computer program, and the processor is configured to invoke and execute the computer program stored in the memory to perform the method according to claim 1.

11. A wireless communication method, comprising:

receiving, by a terminal device, first information transmitted by a network device in response to a Positioning Reference Signal (PRS) configuration being changed, the first information being used by the terminal device for determining an adjusted Measurement Gap (MG) related configuration;

wherein the first information comprises an adjustment amount of the adjusted MG related configuration relative to an MG related configuration before adjustment;

wherein the first information comprises at least one of:

an adjustment amount of a configuration index corresponding to an adjusted MG pattern configuration relative to a configuration index corresponding to an MG pattern configuration before adjustment; or an adjustment amount of a configuration index corresponding to an adjusted MG sharing mechanism configuration relative to a configuration index corresponding to an MG sharing mechanism configuration before adjustment.

12. The method according to claim 11, wherein the first information comprises at least one of:

an adjustment amount corresponding to a periodicity of an MG in an MG pattern configuration;

an adjustment amount corresponding to a length of the MG in the MG pattern configuration;

an adjustment amount corresponding to a start position offset of the MG;

an adjustment amount of a parameter corresponding to an MG sharing mechanism configuration; or an adjustment amount of a measurement priority of a PRS in the MG.

13. The method according to claim 11, wherein the configuration index corresponding to the MG pattern configuration is used for indicating an order position of the MG pattern configuration in an MG pattern configuration sequence, the MG pattern configuration sequence being predefined or configured by the network device, and/or the configuration index corresponding to the MG sharing mechanism configuration is used for indicating an order position of the MG sharing mechanism configuration in an MG sharing mechanism configuration sequence, the MG sharing mechanism configuration sequence being predefined or configured by the network device.

14. The method according to claim 11, further comprising:

measuring, by the terminal device, a PRS based on an adjusted measurement priority corresponding to a PRS.

15. The method according to claim 14, wherein said measuring, by the terminal device, the PRS based on the adjusted measurement priority corresponding to the PRS comprises:

measuring, by the terminal device, PRSs based on a measurement capability of the terminal device in a descending order of measurement priorities corresponding to the PRSs.

16. The method according to claim 15, wherein said measuring, by the terminal device, the PRSs based on the measurement capability of the terminal device in accordance with the measurement priorities corresponding to the PRSs comprises:

measuring, by the terminal device, no PRS with low measurement priority, when the terminal device is incapable of measuring all PRSs based on the measurement capability of the terminal device.

17. The method according to claim 11, wherein the PRS configuration comprises at least one of:

whether a PRS is transmitted;

a number of frequency layers of the PRS;

a length of the PRS in each frequency layer;

a bandwidth of the PRS in each frequency layer;

a number of Transmission Reception Points (TRPs) transmitting the PRS in each frequency layer;

a transmission periodicity of the PRS;

a number of repetitions of the PRS; or a number of symbols occupied by the PRS in each frequency layer, and/or an MG related configuration comprises at least one of:

an MG pattern configuration;

an MG sharing mechanism configuration; or a measurement priority configuration for a PRS in an MG.

18. The method according to claim 11, wherein an MG related configuration comprises at least one of:

an MG pattern configuration;

an MG sharing mechanism configuration; or a measurement priority configuration for a PRS in an MG.

19. The method according to claim 11, wherein the first information is transmitted via at least one of:

Radio Resource Control (RRC) signaling;

a Media Access Control Control Element (MAC CE); or

Downlink Control Information (DCI).

20. The method according to claim 11, wherein the first information is carried by a first signaling, wherein the first signaling is a feedback signaling of the network device for a first request transmitted by the terminal device, the first request being used for requesting an adjustment to the PRS configuration, or the first information is carried by a second signaling, wherein the second signaling is a feedback signaling of the network device for a second request transmitted by the terminal device, the second request being used for requesting an adjustment to the PRS configuration and an MG related configuration, or the first information is carried by a third signaling, the third signaling being used by the network device for adjusting the PRS configuration of the terminal device.

*    *    *    *    *